United States Patent
Raney et al.

(10) Patent No.: US 7,000,437 B2
(45) Date of Patent: Feb. 21, 2006

(54) SYSTEM AND METHOD FOR ECONOMICALLY VIABLE AND ENVIRONMENTALLY FRIENDLY CENTRAL PROCESSING OF HOME LAUNDRY

(75) Inventors: Kirk Herbert Raney, Houston, TX (US); Edwin E. Tucker, Norman, OK (US); John Frederick Scamehorn, Norman, OK (US); Sherril Duane Christian, deceased, late of Norman, OK (US); by Delores Christian, legal representative, Norman, OK (US); Stephen Franklin Capps, The Woodlands, TX (US); Leonard Michael Haberman, Cypress, TX (US)

(73) Assignee: Shell Oil Company, Houston, TX (US)

( * ) Notice: Subject to any disclaimer, the term of this patent is extended or adjusted under 35 U.S.C. 154(b) by 505 days.

(21) Appl. No.: 09/949,746

(22) Filed: Sep. 10, 2001

(65) Prior Publication Data
US 2002/0162177 A1    Nov. 7, 2002

Related U.S. Application Data

(60) Provisional application No. 60/262,613, filed on Jan. 18, 2001.

(51) Int. Cl.
*D06F 39/10*   (2006.01)
(52) U.S. Cl. .............................. 68/18 F; 68/184; 68/19; 210/195.5
(58) Field of Classification Search ................ 68/18 F, 68/18 R, 19, 147, 184, 175; 134/110, 111; 210/195.1, 195.2, 321.1, 323.1
See application file for complete search history.

(56) References Cited

U.S. PATENT DOCUMENTS

| | | | | |
|---|---|---|---|---|
| 2,130,817 A | * | 9/1938 | Shaw | 8/137 |
| 2,287,927 A | * | 6/1942 | Altorfer | 68/23.5 |
| 2,395,397 A | * | 2/1946 | Croft | 15/308 |
| 2,412,722 A | * | 12/1946 | Dyer | 74/22 R |
| 2,588,774 A | * | 3/1952 | Smith | 68/12.13 |
| 3,046,081 A | * | 7/1962 | Smith et al. | 8/159 |
| 3,583,181 A | * | 6/1971 | Brillet | 68/18 F |

(Continued)

FOREIGN PATENT DOCUMENTS

DE    3513939 A1    12/1985

(Continued)

OTHER PUBLICATIONS

Europena Patent Office 578,006 Jan. 1994.*

(Continued)

*Primary Examiner*—Frankie L. Stinson

(57) ABSTRACT

An economically viable process and system for centrally processing multiple loads of laundry with minimum environmental impact. A system and method of laundering whereby successive loads of laundry may be washed while continuously providing effective soil removal comprising at least partially recycled wash water from at least one previous wash cycle. The system and the method of using the same comprises filtering wash water with at least one filter to form wash retentate and wash permeate. The use of wash permeate in successive washes provides for reuse of chemicals and water recovery. A similar arrangement may be used with regard to the rinse water. Advantageously, one embodiment of the invention provides for the use of rinse retentate as make up water in the wash loop which increases water recovery and chemical recovery. Ultimately, the invention can reduce the production of gray water and recover chemicals used in the laundering process.

59 Claims, 17 Drawing Sheets

U.S. PATENT DOCUMENTS

| | | | |
|---|---|---|---|
| 3,911,938 A * | 10/1975 | Wiltrout | 134/104.1 |
| 3,915,857 A * | 10/1975 | Olson | 210/668 |
| 4,975,199 A * | 12/1990 | Woster et al. | 210/638 |
| 5,097,556 A * | 3/1992 | Engel et al. | 8/158 |
| 5,241,720 A * | 9/1993 | Engel et al. | 8/158 |
| 5,241,843 A * | 9/1993 | Hein | 68/3 R |
| 5,307,650 A | 5/1994 | Mertz | 68/12.12 |
| 5,403,498 A * | 4/1995 | Morrissey et al. | 210/767 |
| 5,787,537 A * | 8/1998 | Mannillo | 8/158 |
| 5,827,373 A * | 10/1998 | Eriksson | 134/10 |
| 5,868,937 A * | 2/1999 | Back et al. | 210/651 |
| 5,885,459 A * | 3/1999 | Lerche et al. | 210/602 |
| 5,960,501 A * | 10/1999 | Burdick | 8/158 |
| 6,010,621 A * | 1/2000 | Pattee | 210/114 |
| 6,195,825 B1 * | 3/2001 | Jones | 8/158 |
| 6,393,643 B1 * | 5/2002 | Wientjens | 8/159 |

FOREIGN PATENT DOCUMENTS

| | | |
|---|---|---|
| DE | 3513940 A1 | 12/1985 |
| DE | 197 09 085 A1 | 11/1997 |
| EP | 0467028 A1 | 1/1992 |
| EP | 0578006 A1 | 1/1994 |
| EP | 0845555 A1 | 6/1998 |
| FR | 2672043 | 7/1992 |
| WO | WO 96/35641 | 11/1996 |
| WO | WO 97/23415 | 7/1997 |
| WO | WO 97/24422 | 7/1997 |
| WO | WO 98/32908 | 7/1998 |
| WO | WO 98/59025 | 12/1998 |
| WO | WO 99/06817 | 2/1999 |

OTHER PUBLICATIONS

"Separation of na Anionic Surfacent by Nanofiltration," by Antonio C. Archer, Adelio M. Mendes and Rui A. R. Boaventura, *Environ. Sci. Technol*, 1999, 23, pp. 2758-2764.

"Membrane Ultrafiltration to Treat Laundry Wastes and Shower Wastes for Water Reuse," by Robert B. Grieves, Dibakar Bhattacharyya and J. W. Paul, *Intersociety Conference on Environmental Systems*, Seattle, Washington, Jul. 29-Aug. 1, 1974, pp. 1-10.

"Recovery of Surfactant from Micellar-Enchanced Ultrafiltration Using a Precipitation Process," by B. Wu, S. D. Christian, and J. F. Scamehorn, *Progr. Colloid. Polym. Sci.*, vol. 109, 1998, pp. 60-73.

International Search Report of Jun. 18, 2002.

* cited by examiner

US 7,000,437 B2

SYSTEM AND METHOD FOR ECONOMICALLY VIABLE AND ENVIRONMENTALLY FRIENDLY CENTRAL PROCESSING OF HOME LAUNDRY

This application claims the benefit of U.S. Provisional Application No. 60/262,613 filed Jan. 18, 2001, the entire disclosure of which is hereby incorporated by reference.

FIELD OF THE INVENTION

The present invention relates to a process for central processing of home laundry that improves efficiency and reduces environmental impact by recycling water and chemicals.

BACKGROUND OF THE INVENTION

The United States is increasingly burdened with higher potable water demands and more costly downstream water treatment processes. As a practical matter, the costs for water treatment and supply are ultimately borne by the consumer. Reductions in these costs, where economically feasible, draw strong political and commercial support.

Military, industrial, and residential sources generate voluminous quantities of "gray water" from dishwashers, wash vessels, sinks, showers, and bathtubs. These devices generate gray water and typically lack any form of recycling system. A large number of states have adopted codes for reuse of gray water. Therefore, the impetus for developing robust and economical separation strategies is a reality. The Department of Energy ("DoE") is pushing the private sector to develop more efficient, lower-water usage washing machines with minimal byproducts that are capable of using cold water.

SUMMARY OF THE INVENTION

The present invention provides a system and method using the system whereby successive loads of laundry may be washed while continuously providing effective soil removal comprising at least partially recycled wash water from at least one previous wash cycle. The system works well in laundering a wide range of stains and soils, such as those that are encountered in home laundry. The system and the method of using the same comprise filtering wash water with at least one filter to form wash retentate and wash permeate. The use of wash permeate in successive washes provides for reuse of chemicals and water recovery. A similar arrangement may be used with regard to the rinse water. Advantageously, one embodiment of the invention provides for the use of rinse retentate as make up water in the wash loop that increases water recovery and chemical recovery. The use of additional loops may provide greater recovery. Ultimately, the invention can reduce the production of gray water, reduce the discharge of potentially harmful detergent ingredients into the environment, and recover chemicals used in the laundering process.

The present invention provides a central laundry processing system comprising at least one wash vessel; at least one detergent initially disposed in the at least one wash vessel; and at least one wash loop wherein the at least one wash loop comprises at least one wash effluent vessel in fluid communication with the at least one wash vessel, at least one wash filter in fluid communication with the at least one wash effluent vessel, and at least one wash permeate vessel in fluid communication with the at least one wash filter and the at least one wash vessel.

The invention also provides a method of processing laundry which comprises the steps of washing a first load of laundry with a detergent in at least one wash vessel to produce a first clean load of laundry and a first wash effluent; passing the first wash effluent through at least one wash filter, producing a first wash permeate and a first wash retentate; and rinsing the first clean load of laundry to produce a first rinsed load of laundry and a first rinse effluent.

DETAILED DESCRIPTION OF THE INVENTION

Figure 1:
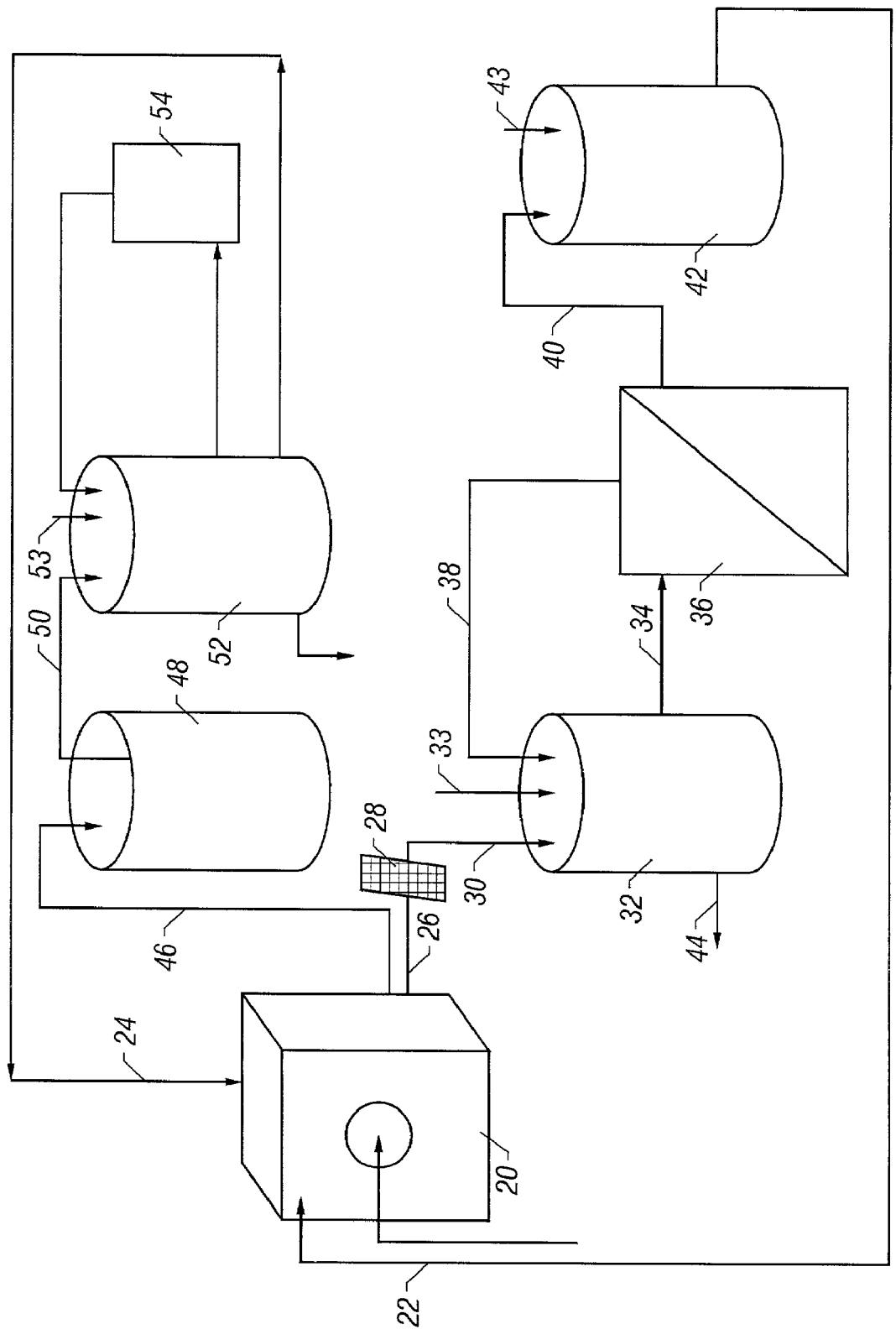
FIG. 1 is a process flow diagram of one embodiment of the present invention.

The present invention provides an economically viable process for central and substantially continuous processing of home laundry in an industrial laundering system. The process preferably achieves effective soil removal and efficient water and surfactant recovery and recycling. As used herein, detergency is relative to an initial wash in a series where fresh water is used.

In one embodiment, the percent removal or "detergency" may be calculated as follows:

% Removal=$\{[(R_W-R_S)/(R_O-R_S)]\}(100)$
$R_W$=reflectance of the washed swatches
$R_S$=reflectance of the soiled swatches
$R_O$=reflectance of the blank swatches (scoured fabric)
$R_i=100-((100-L_i)^2+a_i^2+b_i^2)^{1/2}$
"L"=reflectance on black/white scale
"a"=reflectance on red/green scale
"b"=reflectance on yellow/blue scale Furthermore, effective soil removal preferably retains the color-fastness of the fabric cleaned.

In addition to achieving effective soil removal, the present invention provides for efficient recovery of water and surfactants. Overall water recovery is least about 60%, preferably at least about 70%, and more preferably at least about 80%, and most preferably about 90% or more. Overall surfactant recovery is at least about 10%, preferably about 20% or more, and more preferably about 30% or more.

Numerous aspects of the invention may be varied without departing from the scope of the invention. The following parameters may be varied, depending on the situation and the specific parameters desired. With regard to each parameter, a preferred parameter or range has been shown, but those skilled in the art should recognize that these parameters are not definitive, but illustrative of the benefits of a preferred embodiment of the invention.

For example, the filter size affects the size of contaminants and detergent ingredients that are returned to washer in water. The filter size may have the following effects: about one micron filters remove hair, pollen, and sand; about 0.1 micron filters remove most bacteria and dust; about 0.01 micron filters remove viruses and carbon black; and about 0.001 micron filters remove synthetic dye and surfactants. Though smaller pore sizes reduce water flux during filtration, those skilled in the art will recognize the benefits of selecting a certain filter depending on which contaminants and detergent ingredients are desired to be returned to the wash vessel in the water. Though a preferred range of filters is about 0.005 to about 5 microns, a more preferred filter size is about 0.01 to about 0.2 microns which allows the removal of dirt, viruses, and bacteria without removing most surfactant or similar cleaning agent and also allows reasonable water flux.

Furthermore, the filter material affects the rate of water flux and surfactant flux and provides the chemical and physical resistance of the filter. Fluoropolymers such as polytetrafluoroethylene or Teflon® materials are hydrophobic but are resistant to temperature and chemicals like bleach. Polyacrylonitrile is hydrophilic, allows good water flux as a result, but is less resistant to high temperature and corrosive chemicals. Filter materials may also include ceramics, polyethylene terephthalate, polyvinylidene fluoride, cellulose, cellulose acetate, and polypropylene. In a preferred embodiment, the filter may contain polyacrylonitrile because it provides good water and surfactant recovery and has reasonably good chemical resistance at conditions utilized in this process.

Moreover, the type of filter determines rate of water flux and fouling while determining mechanical action occurring at the surface of the membrane. Types of filters that are effective include filters capable of crossflow filtration or vibratory-enhanced filtration. Both of these types provide good water flux with minimal fouling with typical soil loading in the washwater.

The wash vessel or washing machine type affects the mode of cleaning and the size of laundry load allowed in the system. Wash vessels or washing machines that may incorporated into the system include but are not limited to household top-load machines, household front-load machines, and industrial front-load machines. The incorporation of at least one industrial front-load washing machine is preferable because each machine may be capable of segregating wash and rinse water and/or automatically dosing detergent while providing the best option for large-scale processing of laundry.

Detergent type determines cleaning profile achieved in laundry process. Notably, the detergent may be a powder or a liquid. Preferably, the detergent comprises: surfactants such as anionic, nonionic, cationic, phosphates, and/or amphoteric surfactants capable of providing cleaning and foaming; builders such as sodium carbonate, zeolite, and/or soda ash capable of minimizing the effects of water hardness and minimizing soil redeposition; hydrotropes capable of increasing solubility of ingredients in liquid formulations; fluorescent whitening agents to whiten fabrics; enzymes to help the surfactants clean tough stains and soils; polymers such as polyvinyl pyrrolidone, carboxymethylcellulose or polyacrylate capable of preventing soil redeposition and dye transfer; perfumes capable of adding fragrance to clothing; bleach containing chlorine or peroxygen compounds capable of whitening fabric; and/or a defoamer such as soap or silicon oil. Preferably, all of these ingredients can be used in the wash recycle. Chlorine bleach should be added separately in the wash cycle from the rest of the ingredients for optimal performance. In a most preferred embodiment, the use of liquid detergent with no zeolite (because zeolite may clog the filter and is not necessary in soft water), chlorine bleach used in last part of wash cycle, and nonionic surfactants and silicone defoamers that provide the preferred low foaming in soft water are used. Although substantially any laundry detergent may be used in the process of the invention, liquid laundry detergents are preferred. A most preferred liquid laundry detergent is liquid Procter & Gamble's Tide High Efficiency™ detergent known as Tide HE™ detergent. Additional detergents such as Unilever's Wisk™ are envisioned to be within the scope of the invention. Those skilled in the art will recognize that virtually any detergent comprising at least one surfactant may benefit from the present invention.

As discussed herein, the water quality is also a factor. Soft or hard water affects the level of cleaning and foaming. Though the present invention may use soft or hard water, soft water is preferred for cleaning and rinsing. In the event that soft water is used, a defoamer may be needed to prevent excessive foaming during washing and rinsing. Hard water or soft water may be used as the wash water in the invention. In a preferred embodiment, soft water is used. As used herein, the term "soft water" is defined to mean water that is substantially free of multivalent ions, including but not necessarily limited to calcium and magnesium ions. A preferred embodiment of the invention uses a combination of liquid detergent, such as liquid Tide HE™ detergent and soft water. When this combination is used, filtration performance may reach a steady state with the soils tested corresponding to good flux and a possible chemical recovery, e.g., surfactant, of about 30%.

Washing temperature affects the level of cleaning and bleaching. The washing temperature (i.e. wash loop) may be between about 10° C. and about 90° C.; approximately 40° C. is preferred to give good cleaning and chlorine bleaching without excessive wear on the clothes. Rinsing temperature has less impact than washing temperature. Lower temperatures mean less energy requirements. Though the rinsing temperature (i.e. rinse loop) may be between about 10° C. and about 90° C., approximately 25° C. will provide good rinsing with little waste of energy. Filtration temperature affects the rate of filtration. Higher temperatures may increase water flux. Though the filtration temperature may be between about 10° C. and about 90° C., approximately 30° C. provides good water flux with little wear on the filter.

The water recycle ratio affects the amount of water, energy, and chemical savings. Water may be recycled in either or both the wash and the rinse loops. Though the recycle ratio may be between about 30% and about 90%, a recycle ratio of between about 80% and about 90% with good cleaning can be achieved with effective filtration of rinse and wash water in the preferred embodiment.

As shown herein, the present invention may include several variations. Some of the preferred variations of the system include: filtering the wash only with fresh water used for rinse to provide good cleaning but lower water recovery; providing two isolated filtered rinse and wash loops that may allow cationic fabric softener to be used in rinse loop; providing two loops with processed rinse retentate used to make up the water in the wash loop which maximizes water and chemical recovery but usually prevents use of cationic fabric softener in rinse loop because cationic will react with anionic in wash cycle water; and providing three or more loops that allows maximum water and chemical recovery by tailoring filtration to allow maximum recovery of chemical and maximum detergent effectiveness of the process.

In one embodiment, the wash water and rinse water do not have to be segregated. The combined wash and rinse water may be treated, a fraction of treated water may be mixed with fresh water, and the resulting mixture may be used for the wash and the rinse steps in subsequent cycles. In this embodiment, foaming of the recycled water in the rinse step may occur that would benefit from the use of a defoamer. Alternatively, the wash water and rinse water may be segregated in order to achieve desired water reuse levels.

In a preferred process for recycling wash and rinse water, an amount of rinse effluent and wash effluent are separately collected from at least one wash vessel and maintained in a segregated fashion. Large particulate matter may be filtered from the wash effluent to produce a prefiltered wash effluent. The prefiltered wash effluent may be microfiltered to produce a wash effluent permeate and a wash effluent retentate. At least a portion of the wash effluent permeate may be recycled back to the wash vessel. Furthermore, a portion of the rinse effluent also may be circulated back to the wash vessel, preferably after a filtration to remove some particulates.

In a preferred embodiment, the rinse water is subjected to substantially the same treatment as the wash water. Preferably, large particulate matter can be filtered from the rinse effluent to produce a prefiltered rinse effluent. The prefiltered rinse effluent may, be microfiltered to produce a rinse effluent retentate and a rinse effluent permeate. At least a portion of the rinse effluent permeate may be recycled back to the wash vessel. Finally, a portion of the rinse effluent retentate also may be added to the prefiltered wash water (preferably before microflitration) in order to avoid the need to add fresh make-up water to the wash loop and to maximize water and surfact ant recovery.

The following provides some of the preferred embodiments of the invention. Like designation numerals have been used for like elements throughout. Those skilled in the art realize that substantial deviation from these embodiments is envisioned to be within the scope of the invention.

Referring to FIG. 1, a load of laundry is placed in a wash vessel 20. A hot or wash water feed 22 provides hot or warm water into the wash vessel 20 to wash the laundry. A cold or rinse water feed 24 provides cold water into the wash vessel 20 to rinse the laundry. The hardness level of the wash water feed 22 and the rinse water feed 24 impact the efficiency of the process. Preferably, the water for both feeds is "soft water."

The temperature of the water in each feed impacts the efficiency of soil removal. The wash water will clean more effectively if it is warmed before being fed into the wash vessel. The wash water feed 22 is heated to about 40° C. Those skilled in the art will recognize that variation of the temperature is within the scope of the invention. The water may be heated using any suitable means, such as a steam coil, electrical coil, or similar method known to those skilled in the art.

After a wash cycle, the wash water effluent 26 is passed through a suitable large pore filter 28 to remove large particulate matter. Large particle matter includes visible particulate matter and matter having a relatively high molecular weight. Typically, suitable filters will not retain molecules with molecular weight below about 500,000. Examples of suitable filters include, but are not necessarily limited to, wire mesh or other sieves or large pore filters. The prefiltered wash efffluent 30 is collected in a holding vessel 32 and mixed with make-up water 33, as necessary. Preferably, the make-up water 33 also is soft water.

The wash effluent stream 34 is passed to a filter 36. The filter 36 may be any suitable filter adapted to reject or remove "filtrate" comprising species with a molecular weight cut off ("MWCO") of about 5,000 or more, including, but not necessarily limited to reverse osmosis filters, nanofilters, ultrafilters, and microfilters. In a preferred embodiment, the wash effluent stream 34 is passed through a microfilter known as a tubular membrane filter such as that described in U.S. Pat. No. 5,868,937, which is incorporated herein by reference. A most preferred tubular membrane filter comprises a tubular membrane with an average pore diameter of about 0.1 micron. This pore size is expected to remove particulates, emulsifier oily soils, and/or insoluble builders such as zeolites.

Membrane filtration is defined as the use of polymeric or ceramic substrates in the form of spiral-wound modules or tubes designed to separate species in a liquid or gas stream according to molecular size and chemical properties. The spectrum of membrane filtration for liquids varies from reverse osmosis ("RO") to microfiltration ("MF"), between which nanofiltration ("NF") and ultrafiltration ("UF") fall. The spectrum itself is defined in terms of MWCO, which is a measure of the molecular sizes (i.e., molecular weight of species) beyond which the membrane will reject. The assigned values for RO, NF, UF, and MF are nominal and also depend on the membrane. For the purposes of the following discussion, "microfiltration" will refer to molecular weight cutoffs in the range of between about 5,000 and about 500,000. For example, species such as endotoxins, pyrogens, virus, bacteria, pigments, dyes, red blood cells, emulsified oils, and other organics, asbestos, and pollen can be removed by membranes having MWCOs of nominally about 5,000 or less.

Reverse osmosis or RO will reject species on an ionic scale (molecular weights of between about 200 and about 500 and lower). Nanofiltration or NF will reject species on a molecular scale (molecular weights of between about 200 and about 10,000). Ultrafiltration or UF will reject species in the macro-molecular scale (molecular weights of between about 1,000 and about 500,000). Finally, microfiltration or MF will reject species from molecular weights of between about a 100,000 and about 1,000,0000 (pore size of between about 0.05 microns and about 1 micron). All four separation categories should reject bacteria—a benefit in recycle systems where bacteria are present. The pressure (i.e., power) and high-pressure plumbing (i.e., system weight) requirements for membrane separation processes decrease from the about 400 lb./in$^2$ absolute ("psia") in RO systems to approximately between about 10 and about 20 lb./in$^2$ gauge ("psig") for MF systems. Aside from the system requirements, the separation results using lower MWCO membranes (e.g., RO) may not always be as desirable and the membranes may be more prone to contamination and plugging problems.

The permeate of a membrane filtration system is generally defined as the fluid (gas or liquid) which permeates through the membrane structure. The retentate is the fluid that does not filter through the membrane structure and is therefore swept across, or out of, the membrane cartridge. Passage of the wash water through the filter 36 produces a wash effluent retentate 38 and a wash effluent permeate 40.

The wash effluent permeate 40 passes to a wash water holding vessel 42 and is mixed with make-up water 43, as needed. Preferably, the make-up water 43 also is soft water. The wash effluent retentate 38 is circulated back to holding tank 32 and later discarded as wastewater 44.

The rinse water 46 similarly is removed from the wash vessel 20 and fed to a rinse water holding vessel 48. Thereafter, the rinse water 50 preferably is transferred from the holding vessel 48 to a mixing vessel 52, where it is mixed with fresh make-up water 53. Because fabric and other particles tend to plug the screen on the washer inlet line 24, a bag filter 54 treats the rinse water in mixing vessel 52 before it is drawn and reintroduced into the wash vessel inlet 24.

Figure 2:
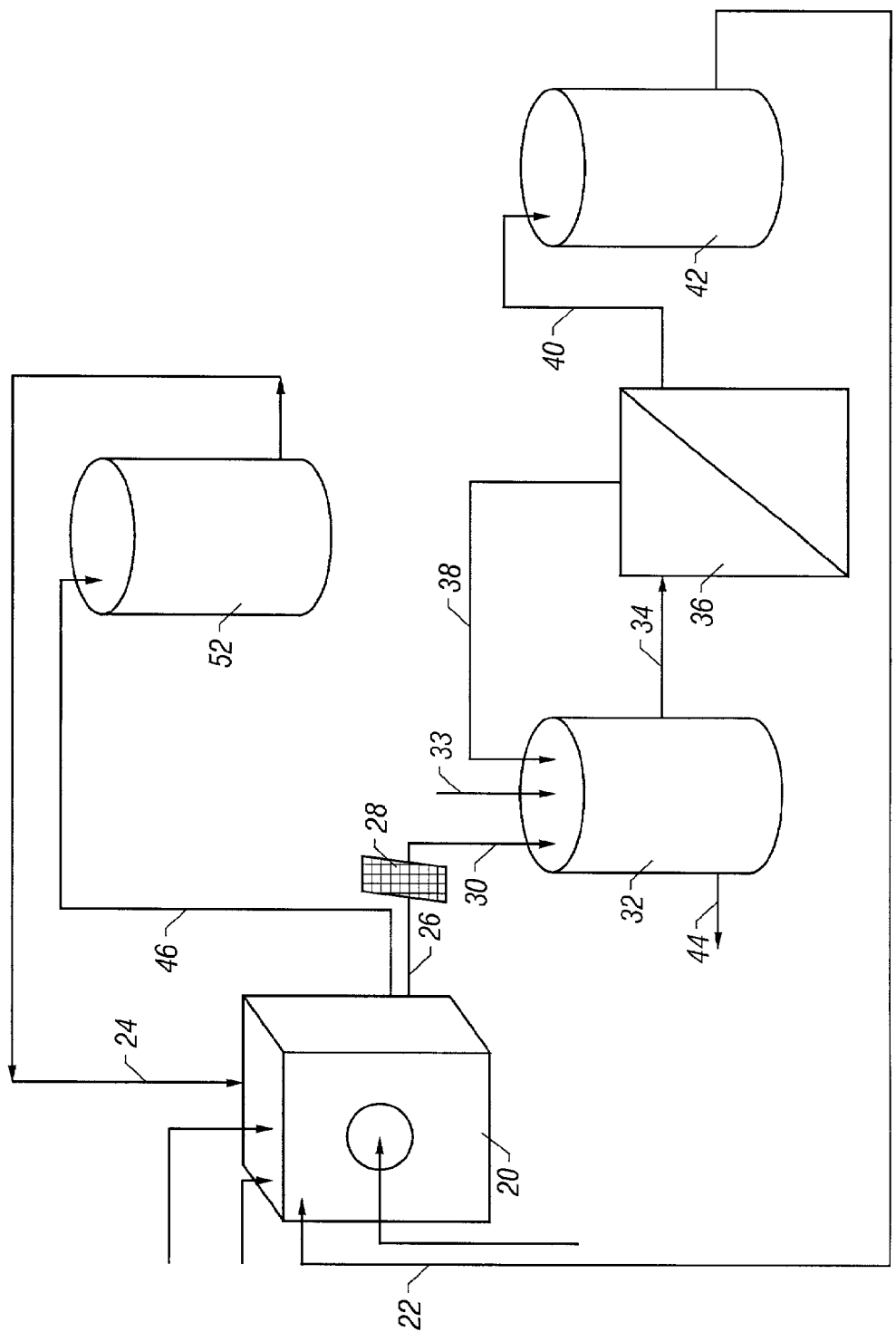
FIG. 2 is a process flow diagram of another embodiment of the present invention.

A second embodiment, depicted in FIG. 2, is substantially the same as the first embodiment and uses like element designations for like elements, except that only one holding vessel 52 is used for the rinse water and the bag filter 54 is omitted. Because the wash loop is the same, only the rinse cycle in FIG. 2 will be described. The rinse water 46 is removed from the wash vessel 20 and fed to a rinse water holding vessel 52. Thereafter, the rinse water 24 preferably is transferred from the holding vessel 52 to a wash vessel 20. In this embodiment, the resulting mixture is reused in the rinse cycle without adding fresh make up water or passing the mixture through a bag filter.

Figure 3:
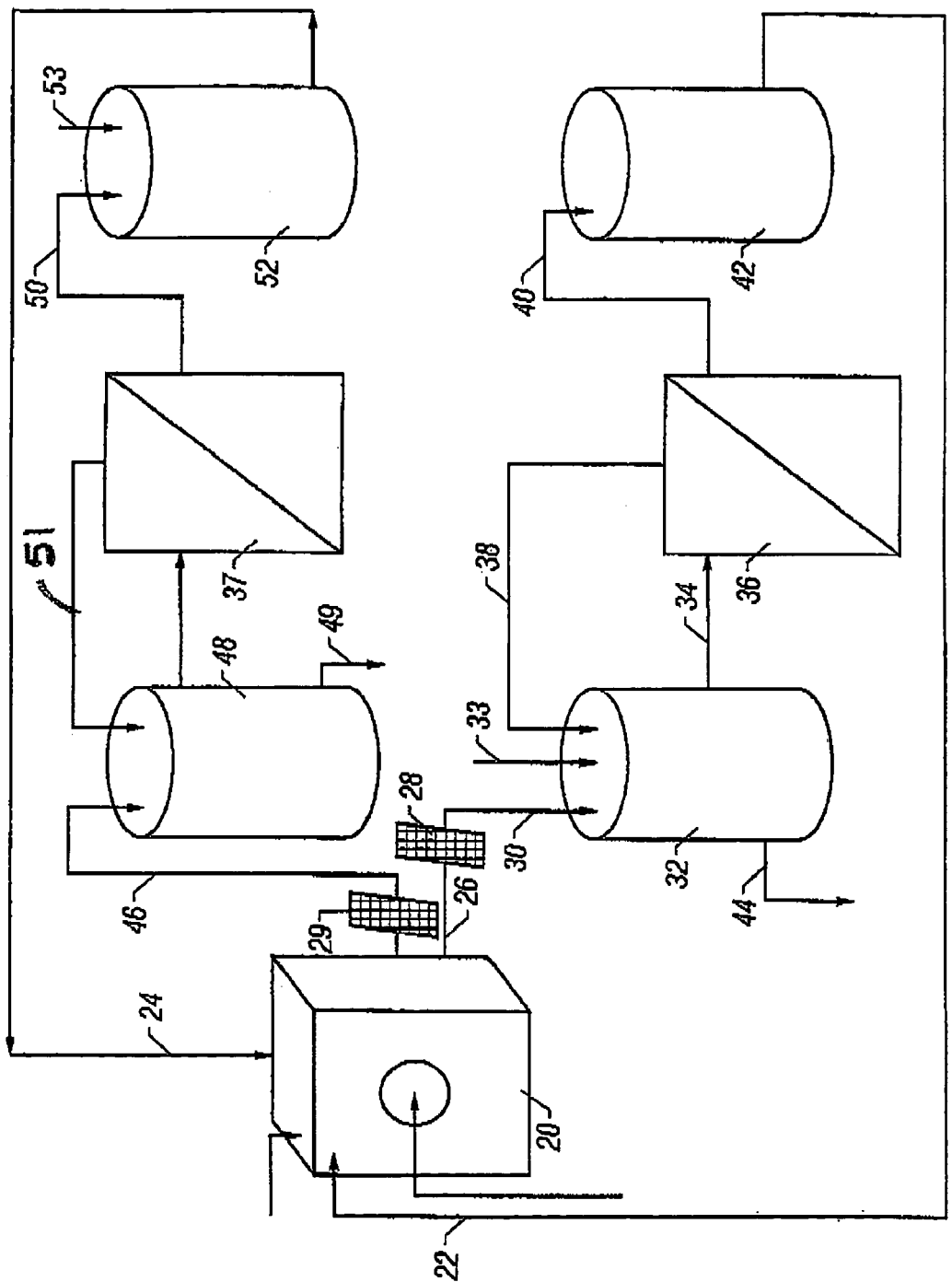
FIG. 3 is a process flow diagram of another embodiment of the present invention.

Another embodiment is depicted in FIG. 3. In addition to many of the elements previously discussed with respect to FIG. 1, wherein similar numerical designations are used to denote similar elements, a second pore filter 29 is disposed in the rinse influent stream 46. Moreover, this embodiment benefits from a second filter 37, that may be any filter such as the ones discussed wit reference to filter 36 in FIG. 1, but is preferably a microfiltration unit. The filter 37 replaces the bag filter 54 system shown in FIG. 1. By disposing the filter 37 between the rinse water holding vessel 48 and the mixing vessel 52, the filter 37 processes the rinse effluent from the rinse water holding vessel 48 to produce a rinse effluent permeate 50 and a rinse effluent retentate 51. At least a portion of the rinse effluent retentate 51 can be returned to the vessel 48 leaving a waste stream 49. The rinse effluent permeate 50 is filtered and may be mixed with fresh make up water 53 in mixing vessel 52.

Figure 4:
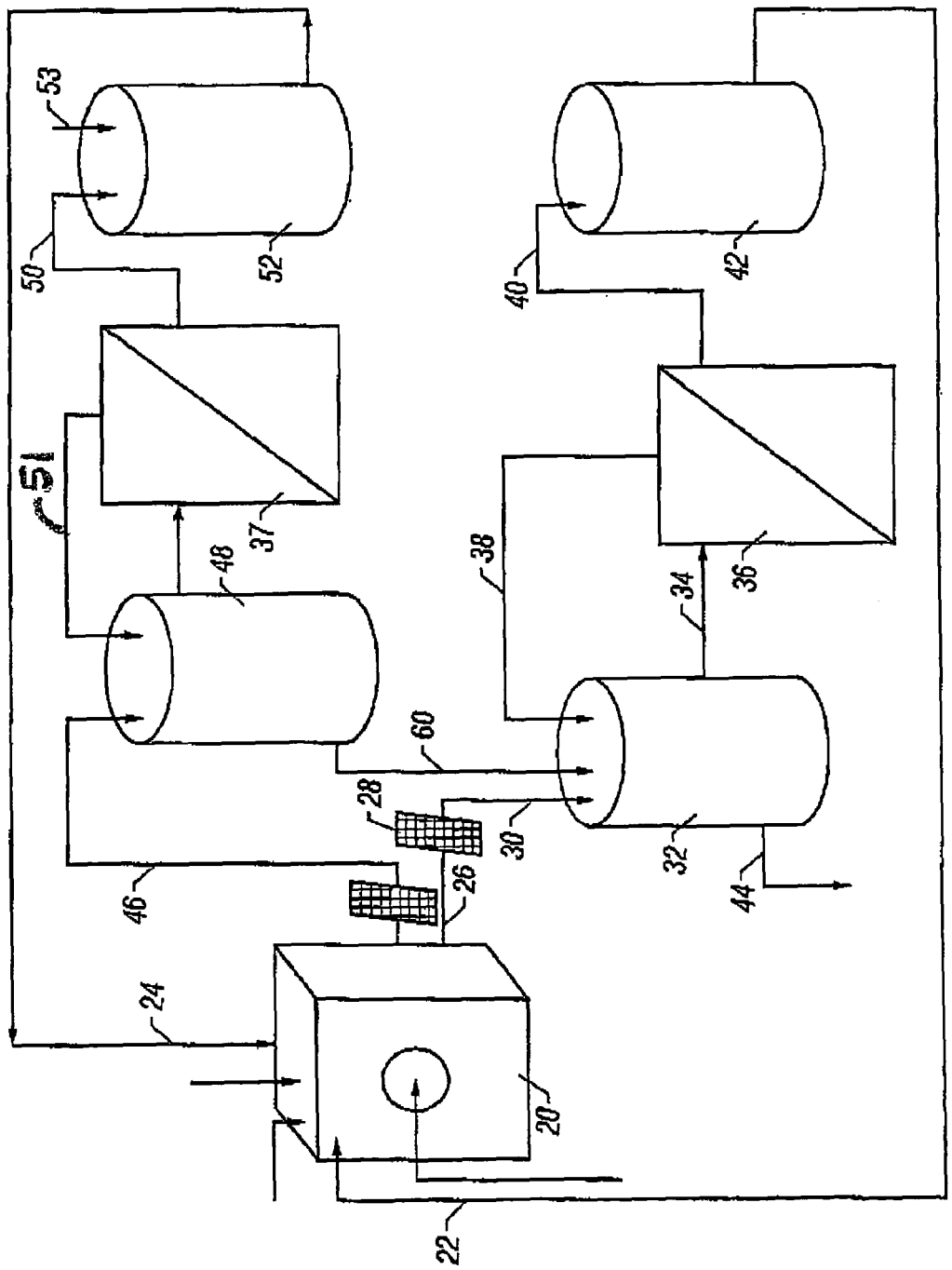
FIG. 4 is a process flow diagram of another embodiment of the present invention.

Another embodiment of the present invention is shown in FIG. 4. Like numeral designations have been used to indicate like elements as previously shown in FIGS. 1–3. A portion of the rinse water retentate 60 is mixed with the wash water effluent in holding vessel 32 prior to filtration. In this embodiment, fresh water (previously shown as element 33 in FIGS. 1–3) preferably is not used as make-up water in the wash water filtration loop.

Removing particulate matter and filtering the permeates reduces the overall amount of water recovered. The loss can be overcome by adding an amount of make-up water to the rinse effluent permeate and the wash effluent permeate. The make-up water added to the wash effluent may be fresh or unrecycled water, rinse effluent (preferably at least prefiltered), rinse effluent retentate, and/or rinse effluent permeate. The rinse effluent permeate and the wash effluent permeate may be passed directly to a wash vessel for re-use, or stored in a storage vessel for future use.

The embodiments have been implemented as shown in the following examples. These illustrations of the invention are not to be considered as limiting the invention to any particular embodiment but rather implementations of preferred embodiments. Those skilled in the art will recognize that substantial deviation is still within the scope of the invention.

EXAMPLE 1

A new consumer Kenmore™ compact wash vessel was used in the initial experiments. Only the wash water was treated and reused. The rinse cycle used fresh water. The wash water was microfiltered with a 0.1-micron pore size filter in a tubular membrane. The pore size treated was expected to remove particulate and emulsifier oily soil, as well as insoluble builders (zeolites), when present. A tubular membrane was resistant to fouling by particulate matter.

Standard test strips containing swatches of different soils were used to test cleaning ability. Redeposition swatches that were initially clean were used to test soils redepositing onto fabric. The reflectance of clothes before and after washing yields the measure of soil removal. This is the standard test in the industry.

A variety of measurements were made on the water at several points in the process to aid in understanding the fate of important chemicals originally present in the detergent. In order to simulate some standard or usual conditions encountered in a Laundromat facility, a ½ cup of powdered Tide™ (with builder, not with bleach) detergent was used and the temperature of wash water was about 40° C. and the temperature of rinse water was about 27° C. All fresh and make-up water was maintained with a water hardness of 150 ppm of $CaCO_3$.

The water was prepared by dissolving 50,000 mg/l (50,000 ppm) hard water, 44.13 g of $CaCl_2.2H_2O$ (MW=147.1), and 40.06 g of $MgCl_2.6H_2O$ in 1 liter deionized water. The water was then diluted with deionized water to maintain about 150 ppm hardness.

The following equipment and materials were also used:
Dryer (Kenmore™ model 7/60901/2/7)
Detergent: Tide™ "Free of Dyes and Perfumes"™ (Wal-Mart™ Supercenter™)
Test strips EMPA 90 (Testfabrics, Inc.)
Membrane unit (0.1 micron microfilter membrane, 0.2 micro lint filter, ultraviolet ("UV") lamp)
$CaCl_2.2H_2O$ and $MgCl_2.6H_2O$
Sodium tripolyphosphate (STPP) (Fisher Scientific)
Hunterlab SN-7834 spectrophotometer In each detergency experiment, two test strips were used. Each of the test strips was comprised of cotton swatches having six different kinds of soils on them. An unbleached swatch and a bleached swatch were used to examine redeposition.

The hot water inlet was used as the feed for the wash step and the cold water inlet for the rinse step. Initially, a cold water tank was filled with 60 gallons of tap water. After adjusting the hardness level to 150 ppm of $CaCO_3$, 20 gallons as previously discussed of the water in the cold water tank was transferred to a hot water tank and heated to about 40° C. To simulate clothes, two test strips, test strip #1 and #2, were pinned to three pounds of scoured fabric.

In order to scour the fabric, the fabric was cut into 45"×23" pieces before being loosely placed into the washer. Then, 50.4 g of sodium tripoly phosphate ("STPP") was added to the wash. The wash vessel was set at regular. The machine was stopped manually after the wash cycle and before the rinse cycle. Again 504 g of STPP was added to the washer for the second, third, and fourth washes. For the fifth cycle, the machine was allowed to go through all the steps, including rinse and spin cycle. The scoured fabric was transferred to the dryer before storing in a clean plastic bag.

A half cup (about 87.5 g) of Tide™ detergent was poured into the wash vessel containing the scoured fabric samples. The wash cycle was carried out at about 40° C. using warm or hot water in the hot water tank. Cold water at about 27° C. from the cold water tank was used for the rinse. After the first wash, both the 15 gal-wash water effluent and the 15 gal-rinse water effluent were transferred to a holding tank before filtering. The permeate from filtration was kept in the cold water tank to be reused for the next wash. The retentate was collected in a vessel after passing through the UV lamp to kill bacteria and circulating to get a sufficient volume. The two test strips were removed for measurement of reflectance using the Hunterlab spectrophotometer after drying. A bleached swatch of each test strip, swatch #8, was cut out from test strips and used as "redeposition swatch." In the second wash, with the same amount of Tide™ detergent, two new test strips, test strip #3 and 4, and redeposition swatches from the previous wash were again pinned onto a new set of about three pounds of scoured fabric. The second wash experiment was carried out as was the first wash except that the feed water to the wash step was permeate from the filtration diluted with fresh water. The detergent dosage was not adjusted. After drying, both test strips and two redeposition swatches were removed for reflectance measurement.

Due to the foam problem occurring in the rinse cycle in this second wash, tap water was used in the rinse cycle without adjusting hardness in the third and subsequent washes. After the third wash, only water effluent was held in the holding tank and rinse water effluent was discarded. To get a sufficient amount of permeate for the next wash cycle, effluent wash water was mixed with about five gallons of fresh water (also at about 150 ppm hardness) before going to the filtration. The fourth and fifth washes were carried out in the same manner as the third wash. Only in the second wash was recycled water used in the rinse cycle.

Redeposition swatches were present in successive washes. For instance, swatch #8, as previously mentioned, of test strip #1 and #2 were present together with test strips #3 and #4 in the second wash. After the experiment was completed, Swatch #8 or bleached cotton was cut out from test strips #3 and 4. All redeposition swatches and test strips #5 and #6 were present in the third wash. In this manner, redeposition swatches were used over and over to examine redeposition. The following Table gives the percent soil removal per wash for various materials:

TABLE 1

Percent Soil Removal

| Description | 1st wash | 2nd wash | 3rd wash | 4th wash | 5th wash |
|---|---|---|---|---|---|
| Red Wine | 44.31 | 42.33 | 45.82 | 41.84 | 42.91 |
| Raw, unbleached | 6.59 | 8.84 | 6.63 | 4.67 | 5.94 |
| Immedial black | 11.29 | 14.15 | 12.33 | 11.21 | 10.89 |
| Blood, milk, carbon black | 58.22 | 54.07 | 55.41 | 52.10 | 51.56 |
| Cocoa | 60.57 | 64.13 | 67.53 | 60.77 | 60.06 |
| Blood | 82.49 | 72.04 | 76.33 | 75.35 | 75.15 |
| Carbon black, olive oil | 42.57 | 53.49 | 51.50 | 49.78 | 48.98 |

As seen from the Table 1, the soil removal varies little over sequential washes. The following tables show that the reflectance or brightness of the redeposition swatches of the test strips appear nearly constant:

TABLE 2

Reflectance of the Swatches

| | Test strip # | | |
|---|---|---|---|
| Wash # | 1, 2 | 3, 4 | 5, 6 |
| 1 | 92.05 | — | — |
| 2 | 94.01 | 92 | — |
| 3 | 94.09 | 94.16 | 92 |
| 4 | 94.02 | 94.12 | 94.35 |
| 5 | 93.84 | 94.01 | 94.21 |

EXAMPLE II

Active matter titration was used to determine the anionic surfactant concentrations (both sulfonates and sulfates) of the experimental solutions as well as a blank. The surfactants were reacted with an aqueous solution of dye. About 20 ml of dimidium bromide/disulphine blue indicator ("DI") stock solution, obtained from Gallard-Schlesinger Industries, Inc., was added to about 200 ml of distilled water in a one liter glass-stoppered mixing cylinder. About 3 ml of concentrated sulfuric acid mix was added and then diluted to one liter with distilled water and again mixed thoroughly. Reagent grade chloroform (Fisher Scientific) was added and the two-phase mixture was titrated with a standard aqueous solution of Hyamine 1622 (Benzethonium chloride, 98%, Lancaster synthesis).

Standard 0.0004 molar Hyamine solution was prepared by dissolving about 1.8 grams of Hyamine 1622 in distilled water and diluting to one liter. Using a 10-ml pipette, about 10 ml of sodium lauryl sulfate ("SLS") determined to have a molarity of 0.003527 was transferred to a graduated cylinder. DI water was added until 20 ml volume was reached. Then, about 20 ml mixed indicator solution and 15 ml chloroform was added.

Next, about 20 ml of surfactant solution (water sample) was added to a 100 ml graduated cylinder and the weight of the solution sample was recorded. Then, about 20 ml of mixed indicator solution and 15 ml chloroform was added to the graduated cylinder. Titration was begun by adding approximately 2 ml of hyamine solution to the cylinder, capping and inverting the cylinder about 10 times, making sure all liquids were mixed. The cylinder was vented after the first inversion as some pressure will build up and cause leakage if not vented. Hyamine solution was added in additional small quantities, mixing well after each addition. The endpoint was reached when the bottom chloroform layer changed color from pink to gray-blue.

The normality of the hyamine was calculated as follows:

$$\text{Normality of Hyamine } (N) = \frac{(10 \text{ ml} SLS)(0.00327 \text{ Molarity of } SLS)}{(\text{ml hyamine used in titration})}$$

At the titration end point the chloroform layer changed from pink to gray-blue.

Samples of wash water permeate were collected and kept in the refrigerator for later analysis. The wt. % active matter in the samples was calculated as follows:

Milli-equivalent (Meq/g)=(N)(ml hyamine used)(100)/ grams of sample used)

% AM=(meq/g)(MW of the test surfactant)/1000

Total organic carbon ("TOC"), inorganic carbon ("IC"), conductivity, pH, and turbidity were measured. Atomic absorption was used to measure $Ca^{+2}$ and $Mg^{+2}$ concentrations.

The active matter of the wash water, permeate, and retentate, are reflected in the following Table 3:

TABLE 3

| | | Active Matter | | | |
| | | | | Active matter balance calculated from | |
| Run No. | Sample | Active matter, ppm | Volume, gal | Water influent to washing Machine, ppm | water effluent from filtration, ppm |
|---|---|---|---|---|---|
| — | Fresh water | — | — | — | — |
| 1 | Wash water__1 | 196.00 | 56.8 (15) | 305.0 | 112.7 |
|   | Permeate__1 | 49.46 | 94.6 (25) | | |
|   | Retentate__1 | 90.66 | 18.9 (5) | | |
| 2 | Wash water__2 | 227.51 | 156.8 (15) | 354.46 | 180.73 |
|   | Permeate__2 | 68.04 | 75.7 (20) | | |
|   | Retentate__2 | 135.01 | 37.9 (10) | | |
| 3 | Wash water__3 | 280.00 | 56.8 (15) | 373.04 | 173.17 |
|   | Permeate__3 | 96.00 | 56.8 (15) | | |
|   | Retentate__3 | 231.50 | 18.9 (5) | | |
| 4 | Wash water__4 | 277.26 | 56.8 (15) | 401.00 | 227.89 |
|   | Permeate__4 | 115.92 | 56.8 (15) | | |
|   | Retentate__4 | 335.92 | 18.9 (5) | | |

"Wash water" (in column 2) = water samples collected right after wash (water effluent from wash vessel)
"Water influent to washing machine" = water samples containing 87.5 grams of detergent and retained detergent from the previous wash
"Water effluent from filtration" = water samples from filtration unit downstream, number in this column refers to the summation of the active matter content in the permeate and the retentate.

Active matter in the wash water sample (right after wash, not including rinse water) was 196 ppm. The concentration of active matter influent was 87.5 g (composition of active matter was 19.8 wt. %) of Tide™ detergent in fifteen gallons of fresh water. Therefore, the active matter in the water influent (shown in column 5, subcolumn 1) was $$\frac{(87.5 \text{ g})}{(15*3.79 \text{ liters})} \times 1000 \times 0.198 = 305 \text{ ppm}$$

In subcolumn 2, the numerical values were calculated from the summation of active matter content in 25 gal of permeate and that in 5 gal of retentate. A certain amount of fresh water was added into the wash water before going to the membrane unit. Accordingly, the concentration needed to be adjusted in the original volume (15gal). Comparing active matter content with each other:

$$\frac{(49.96*25)+(90.66*5)}{30}=56.73 \text{ ppm (after diluted)}$$

The calculation procedure for subsequent runs was the same except that the active matter calculation in "water influent to washing machine" involved a water sample that was now recycled water containing a certain amount of active matter. Consequently, the total concentration of active matter in the water in was, e.g.

49.46+305=354.46 ppm

The concentration of active matter in the retentate was approximately three times that of the permeate, compared to a factor of 2 in blank filtration. Surfactant emulsifying oily soil and adsorbed on particulate soil may have caused this effect. The active matter content increased with the number of runs because the permeate contained some surfactant to which a new dose was added.

The amount of active matter retained in the clothes was calculated by: [active matter in water influent to washing machine, shown in subcolumn 1]–[active matter in wash water, shown in column 3]. For example, for run #1,
[active matter retained in the clothes]=305–196=109 ppm
% retained (based on the water influent to washing machine)=109/305*100=35.74%.

The amount of active matter retained in the membrane unit was calculated by
[active matter in water before going to the filtration unit, shown in column 3]–[active matter in water effluent from filtration, shown in subcolumn 2] For example, run #1,
[active matter retained in the filtration unit] =196–112.7=83.3 ppm % retained (based on the water inlet of filtration)=83.3/196*100=42.5%.

Approximately ⅔ of the original surfactant was in the wash water effluent and ⅓ in the clothing and accompanying retained water:

TABLE 4

Amount of Active Matter Retained

| | Amount of active matter retained in | | | |
|---|---|---|---|---|
| | Clothes* | | filtration unit** | |
| Run No. | ppm | % | ppm | % |
| 1 | 109 | 35.74 | 83.3 | 42.5 |
| 2 | 127 | 35.83 | 46.8 | 20.57 |
| 3 | 93 | 24.93 | 106.8 | 38.14 |
| 4 | 123.7 | 30.85 | 49.4 | 17.82 |

*Numbers represented as the difference amount of active matter in ppm and percent of the wash influent and effluent
**Numbers represented as the difference amount of active matter in ppm and percent of the filtration upstream and downstream The TOC of the water effluent increased with number of runs faster than active matter, possibly due accumulation of oily soil. Inorganic carbon level increased mildly with number of washes (more slowly than TOC) and only mildly greater retentate IC is seen compared to permeate IC.

Figure 5:
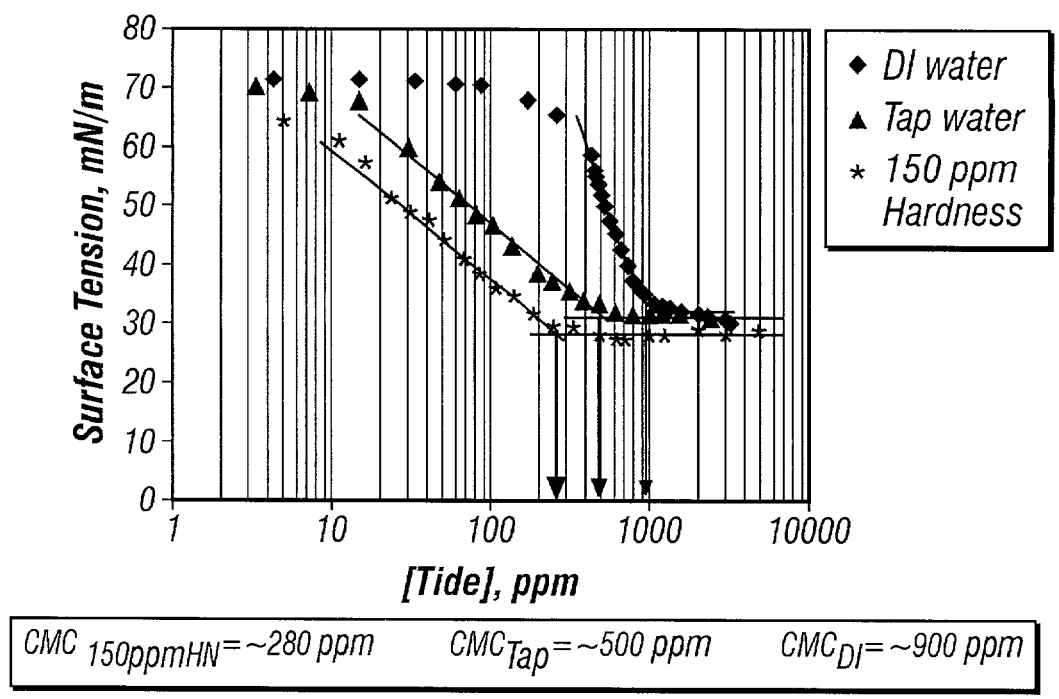
FIG. 5 is a graph of the surface tension vs. detergent concentration for Tide™ powder detergent.

The permeate was so clean that its turbidity was negligible. The turbidity of wash effluent and retentate did not vary much with number of washes. Conductivity and pH increased with the number of washes, possibly because alkali was added with fresh detergent in each load. Since builder was added with each load also, $[Ca^{+2}]$ and $[Mg^{+2}]$ decreased with sequential washes. Since the surfactant concentration in all streams was above the critical micelle concentration ("CMC"), the surface tension was approximately the same for the solutions analyzed as shown in FIG. 5.

EXAMPLE III

Two 0.1 micron membranes (PEF 4172, area 0.17 $m^2$) from Stork were used in these experiments. These membranes should produce a flux of 1000 L per $m^2$ per hour (=2.8 L/min) for pure water at the operating pressure of about 100 KPa. Initial tap water flux for these membranes was determined to be about 1 L/min at 30 psig feed pressure when they were installed in the filtration system.

The first membrane was previously used for the treatment of wash water effluents from the wash vessel. Because of this, the first membrane was washed, treated with 100 ppm bleach, and back flushed with tap water. Four filtration experiments with the first membrane and two experiments with the second membrane were performed.

The second membrane had previously been used to filter the wash sequence with Liquid Tide™ detergent in soft water. The second membrane was not bleach treated or back flushed since it was a new membrane when the liquid Tide HE™ detergent in soft water was filtered. However, the second membrane was cleaned extensively including bleach treatment and back flushing with tap water before filtering SDS in soft water. The back flushing procedure dislodged a substantial quantity of brown/gray slime from the inside of the membrane tubes.

For all experiments, a reservoir connected to the filtration system was filled with soft tap water to the 10.5 gallon mark and tap water was circulated through the system at a rate of about 5.4 gal/min (27 psig feed pressure) until an equilibrium flux was obtained. After the soft tap water flux reached equilibrium, surfactant or detergent was added and an equilibrium flux was established. If hardness (150 ppm as $CaCO_3$) was to be added, then a weighed amount of solid mixed chlorides (Ca/Mg=3/2) was slowly added and a new equilibrium flux was established. Permeate and feed/retentate samples were taken at each equilibrium point, which dropped the water level in reservoir to 10 gallons.

The permeate hose, which had been recycling to the reservoir, was moved to a separate container and about 2.5 gallons of composite permeate was removed from the system. After collection of the composite permeate, the hose was returned to the tank, flux measurement was made with a graduated cylinder, and samples of permeate and feed/retentate were collected (7.5 gallon point). The permeate hose was then moved to another empty container to collect a second composite permeate (about 7.5 gallons to about 5 gallons) and returned to the reservoir for flux measurement and sample collection. Similarly, a collection of third composite permeate (about 5 gallons to about 2.5 gallons) was done.

At this point, the filtration system contained about 2.5 gallons of feed/retentate and three different containers had permeate volumes of 2.5 gallons. When all samples were taken, all three of the permeate volumes were poured back into the reservoir (reconstituted system) containing only slightly less fluid than the original. Flux measurement was made and samples were collected from the reconstituted system. TOC and active matter analysis of water samples were performed.

Figure 6:
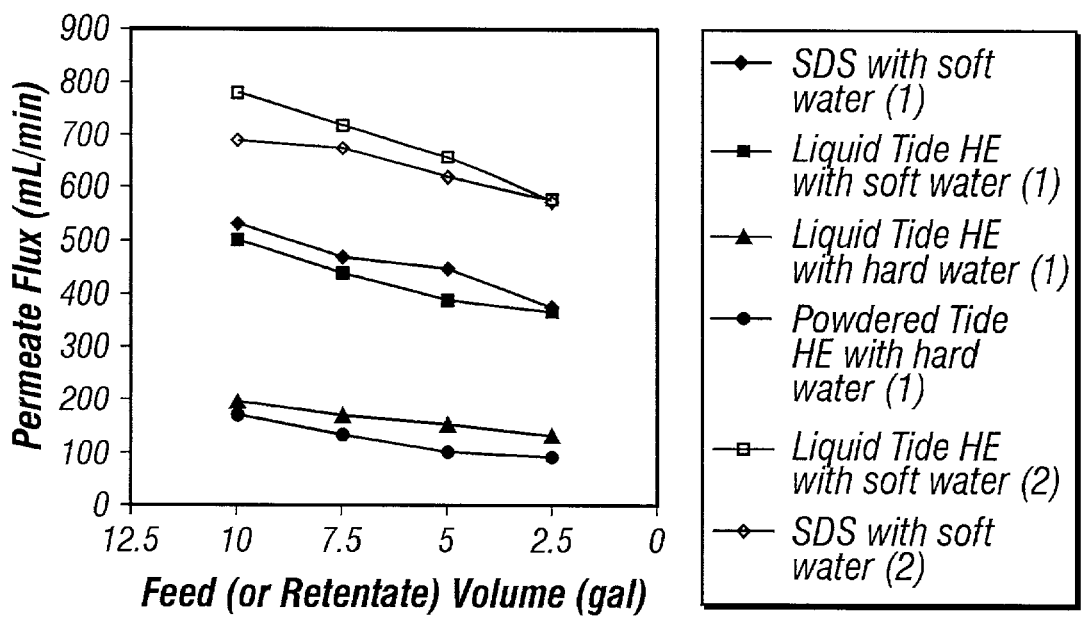
FIG. 6 is a graph of the permeate flux as a function of feed/retentate volume for a variety of combinations.
Figure 7:
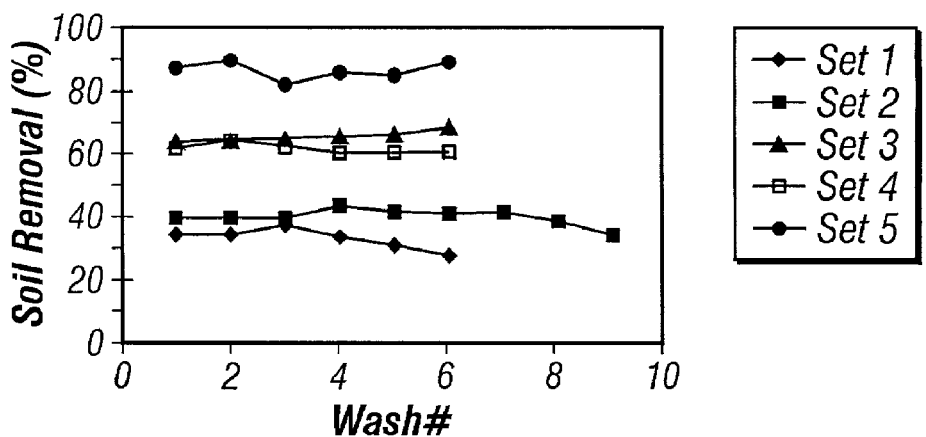
FIG. 7 is a graph of the s oil removal of red wine after subsequent washes under a variety of conditions.
Figure 8:
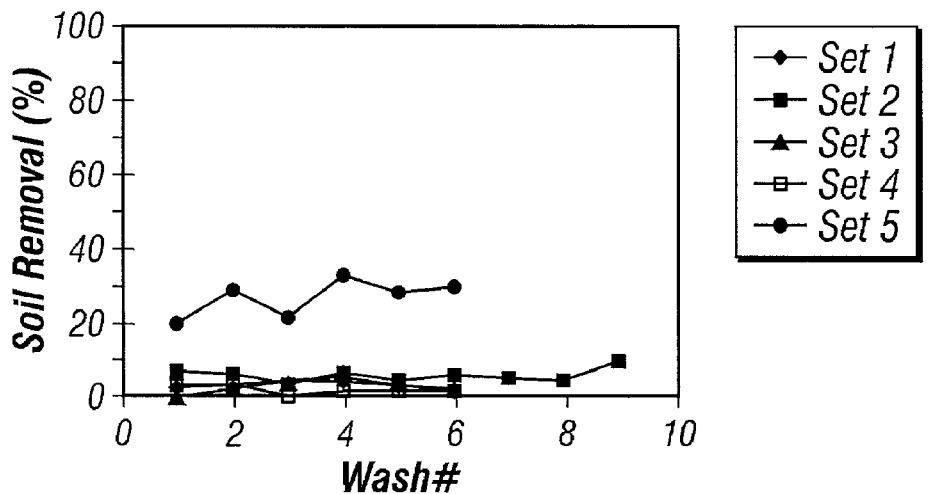
FIG. 8 is a graph of the soil removal of raw, unbleached after subsequent washes under a variety of conditions.
Figure 9:
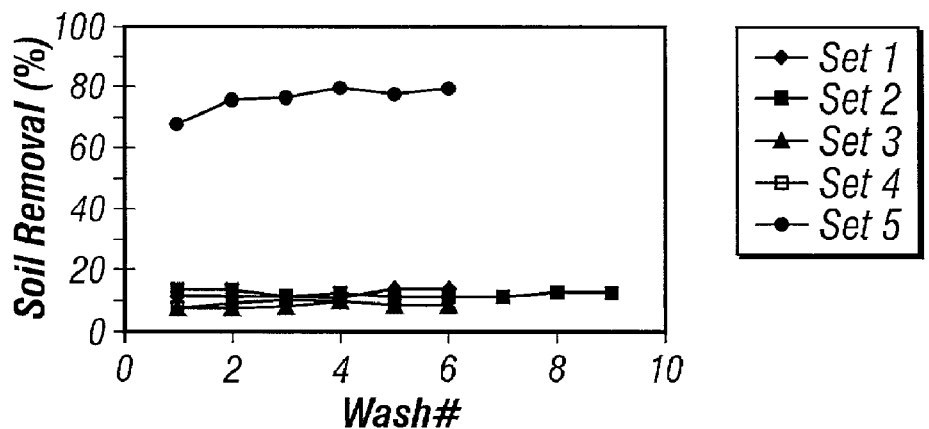
FIG. 9 is a graph of the soil removal of Immedial Black after subsequent washes under a variety of conditions.
Figure 10:
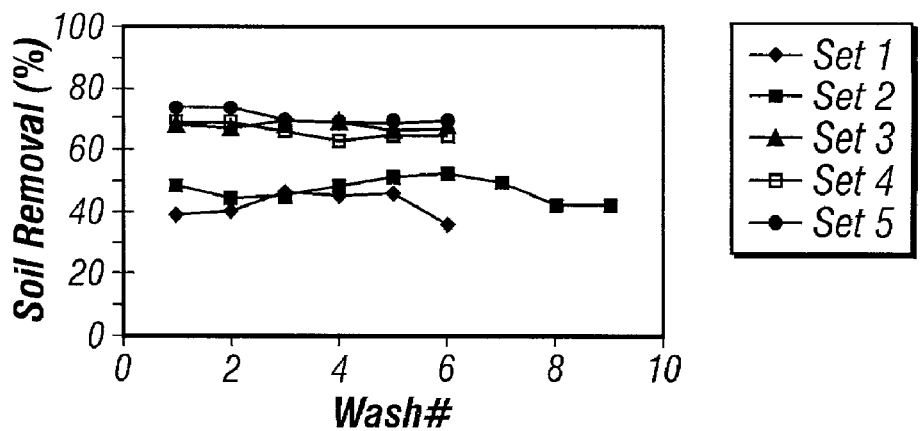
FIG. 10 is a graph of the soil removal of blood, milk, and carbon black after subsequent washes under a variety of conditions.
Figure 11:
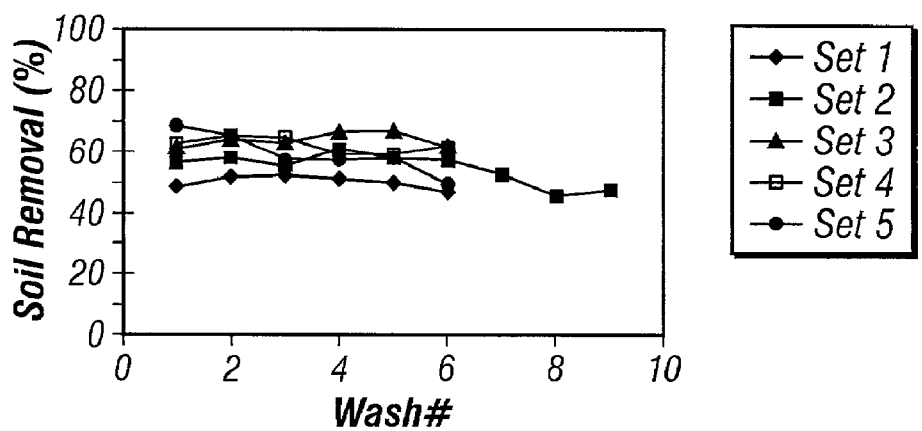
FIG. 11 is a graph of the soil removal of cocoa after subsequent washes under a variety of conditions.
Figure 12:
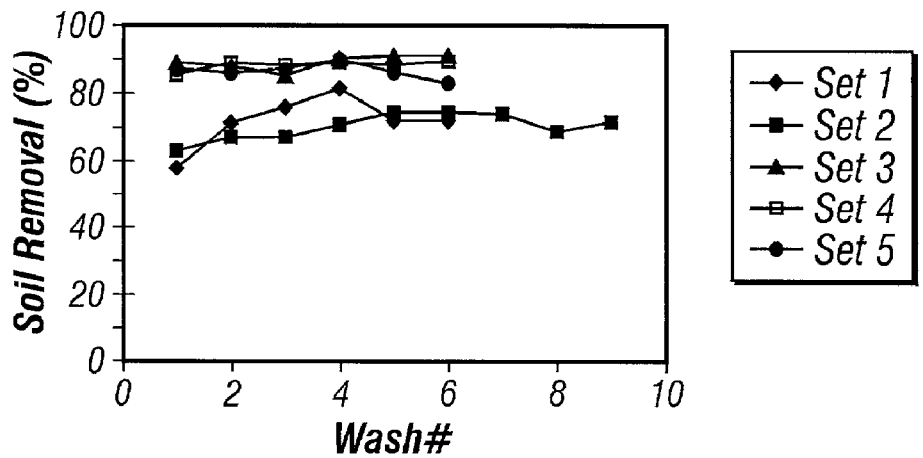
FIG. 12 is a graph of the soil removal of blood after subsequent washes under a variety of conditions.
Figure 13:
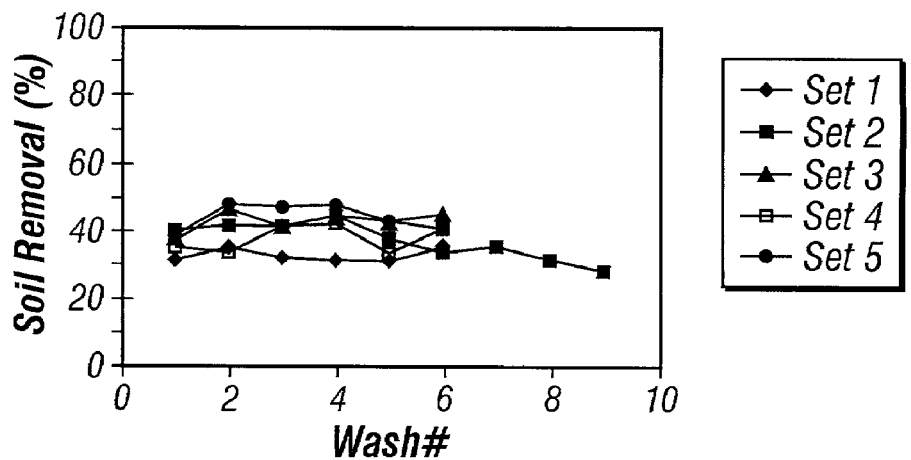
FIG. 13 is a graph of the soil removal of carbon black and olive oil after subsequent washes under a variety of conditions.
Figure 14:
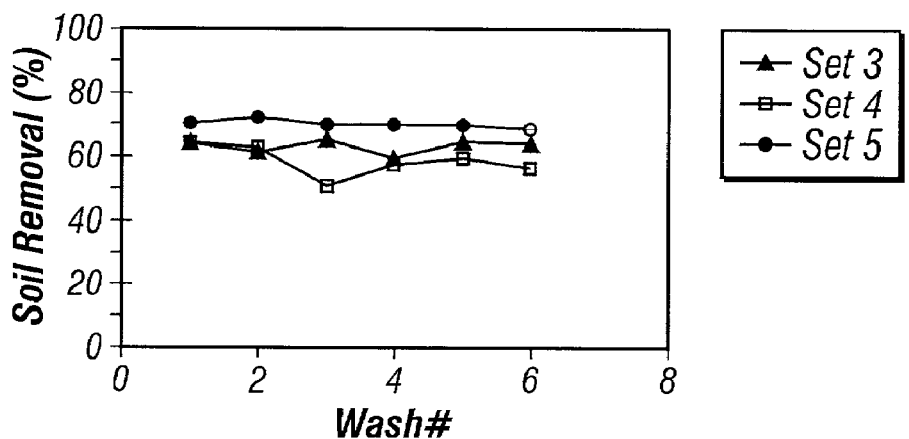
FIG. 14 is a graph of the soil removal of blood, milk, and carbon black after subsequent washes under a variety of conditions.
Figure 15:
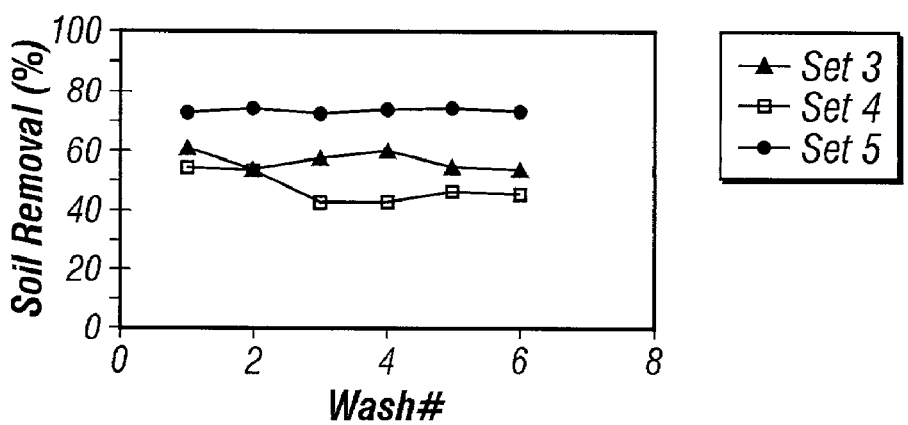
FIG. 15 is a graph of the soil removal of Dust Sebum from cotton after subsequent washes under a variety of conditions.
Figure 16:
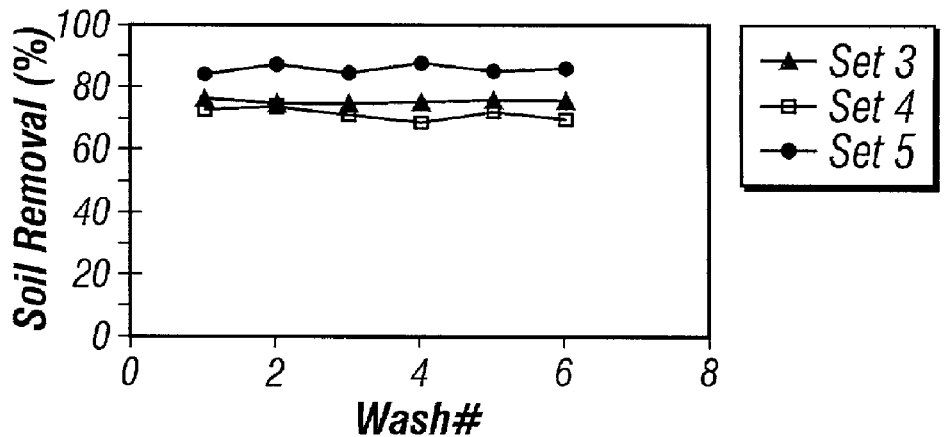
FIG. 16 is a graph of the soil removal of Dust Sebum from polyester after subsequent washes under a variety of conditions.
Figure 17:
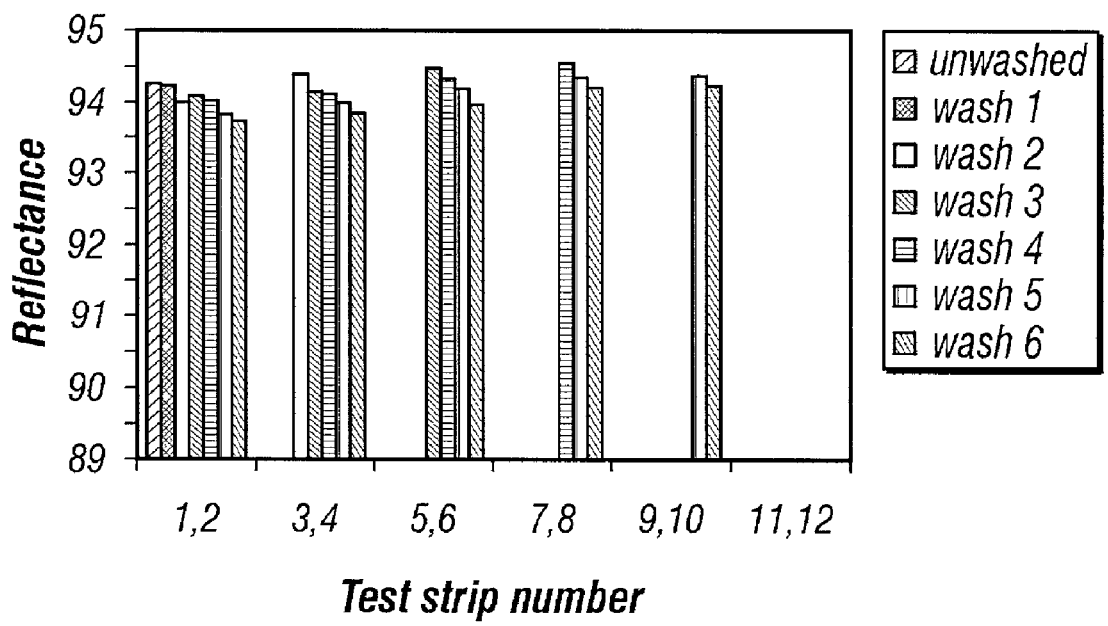
FIG. 17 is a chart showing the reflectance of redeposition swatches from Set 1.
Figure 18:
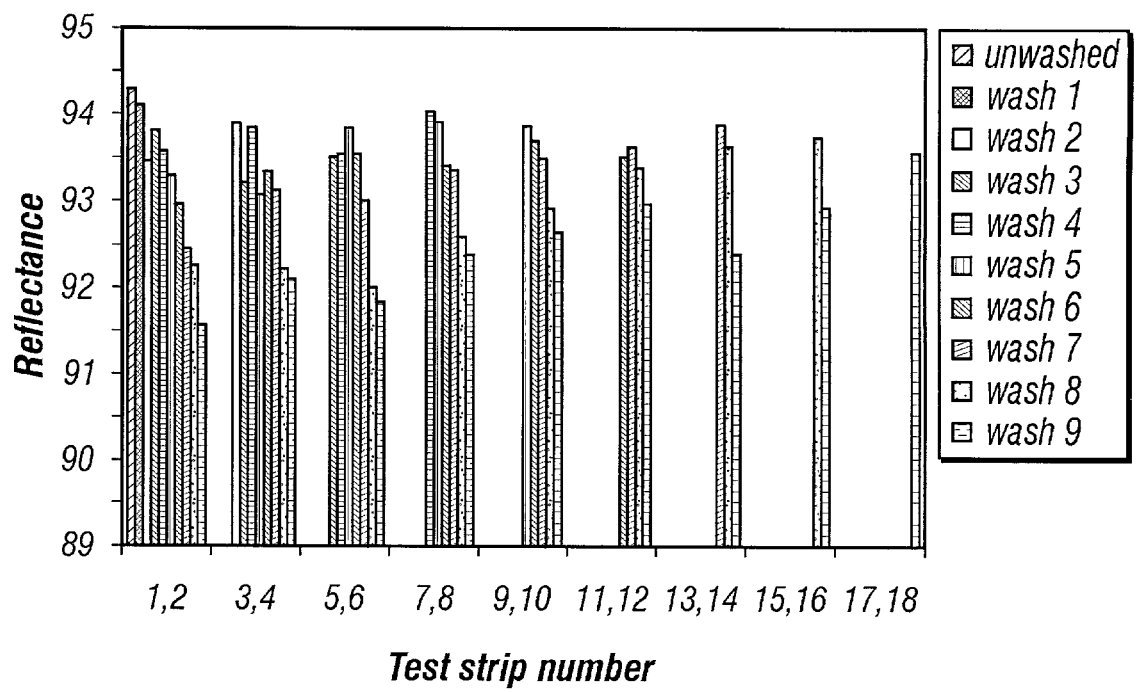
FIG. 18 is a chart showing the reflectance of redeposition swatches from Set 2.
Figure 19:
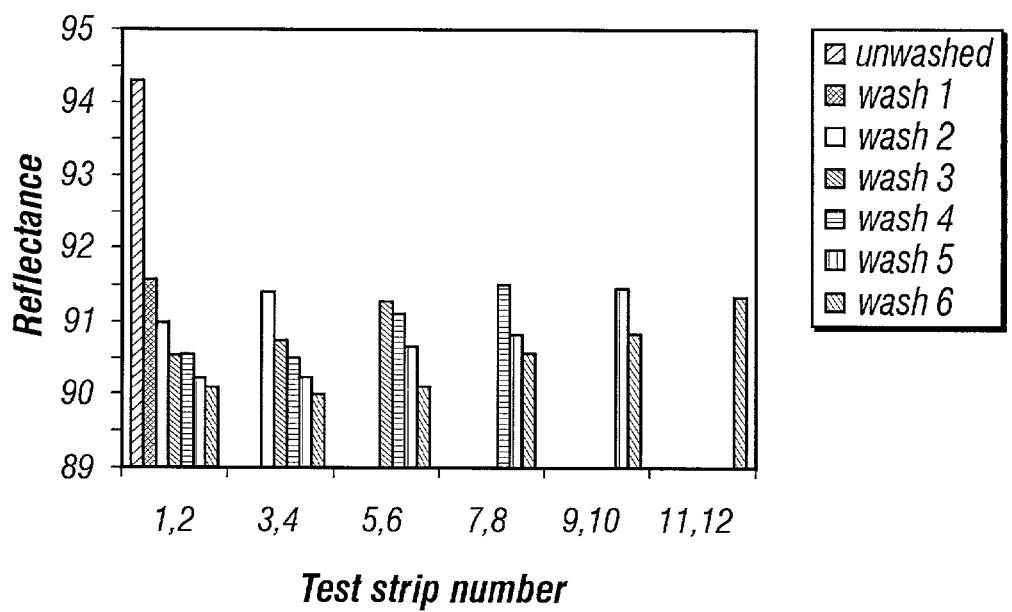
FIG. 19 is a chart showing the reflectance of redeposition swatches from Set 3.
Figure 20:
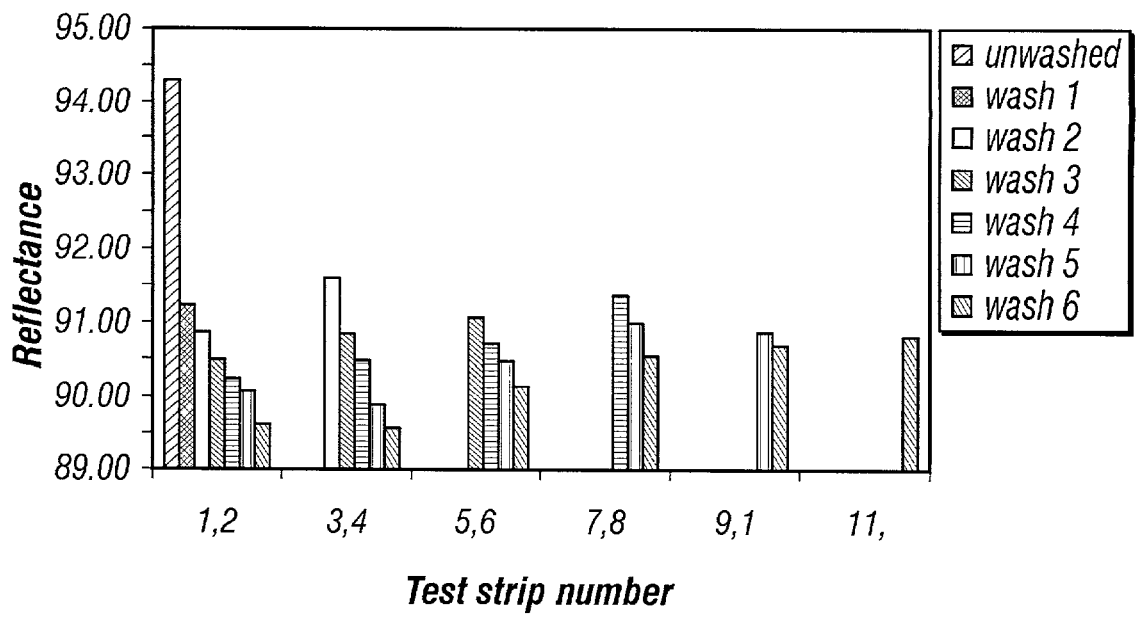
FIG. 20 is a chart showing the reflectance of redeposition swatches from Set 4.

The membrane flux for first and second membranes with tap water was about 700–about 1000 ml/min and about 1110–about 1250 mL/min, respectively. When the SDS, powder Tide HE™ detergent or liquid Tide HE™ detergent was added to water, the flux dropped immediately to about 50% of the tap water value with a feed flow in all cases of 5.4 gallon/min, as shown in the following table and graphically in FIG. 6:

TABLE 5

Flux

| Filtration System | Flux (mL/min) | | |
|---|---|---|---|
| | Tap water Addition | Detergent Addition | Hardness |
| Sodium Dodecyl Sulfate with soft water (first membrane) | 810 | 500 | — |
| Liquid Tide HE with soft water (first membrane) | 890 | 540 | |
| Liquid Tide HE with hard water (first membrane) | 680 | 320 | 195 |
| Powdered Tide HE with hard water (first membrane) | 970 | 380 | 170 |
| Liquid Tide HE with soft water (second membrane) | 1110 | 810 | |
| Sodium Dodecyl Sulfate with soft water (second membrane) | 1740 | 690 | |

A further drop in flux was observed when hardness was added. For example, tap water flux (membrane 1) of about 680 ml/min dropped to about 320 ml/min with the addition of liquid Tide HE™ detergent, and further dropped to about 195 ml/min after hardness was added (this process took about 1.5 hours to reach equilibrium). Tap water flux (membrane 1) of about 970 ml/min dropped to about 380 ml/min with the addition of powder Tide HE™ detergent, and further dropped to about 170 ml/min after hardness was added. Hence, there is a penalty for flux when particulate matter is present in the filtration feed. With liquid Tide™ detergent, the particulate matter increases because of added hardness that is possibly soap precipitation. With powder Tide™ detergent, the particulate matter is primarily zeolite and adding hardness seems to make the problem worse.

When 75% of the feed volume was removed (about 10 gallons to about 2.5 gallons) as permeate, the flux dropped about 17 –about 44% (depending on the system) of the flux at the 10 gallon level. When the three permeate volumes were poured back into the reservoir, the flux increased but did not reach the starting value.

The second membrane had relatively high flux with tap water (about 25% higher than the first membrane). The observations with the second membrane are not unusual in view of the number of cycles the first membrane endured, which included the filtration of zeolite and other mixtures.

Active matter was measured by titration SLS, Hyamine 1622, mixed indicator, chloroform, concentrated sulfuric acid, and TOC was measured using DC 180-Rosemount.

The following Table reflects the active matter results.

TABLE 6

First Membrane Active Matter

| Active Matter (ppm) Feed volume (G) | SDS in soft water | | Liquid Tide HE In soft water | | Liquid Tide HE In hard water | | Powder Tide HE In hard water | |
|---|---|---|---|---|---|---|---|---|
| | Feed (retentate) | Permeate | Feed (retentate) | permeate | Feed (retentate) | permeate | Feed (retentate) | permeate |
| 10 | 1140 | 333 | 338 | 213 | 293 | 179 | 250 | 73 |
| 7.5 | 1200 | 431 | 197 | 326 | 312 | 196 | 303 | 56 |
| 5 | 1270 | 517 | 390 | 205 | 351 | 189 | 496 | 72 |
| 2.5 | 1680 | 776 | 508 | 276 | 512 | 207 | 712 | 82 |

The following Table reflects the TOC analysis.

TABLE 7

First Membrane TOC Analysis

| TOC (ppm) Feed volume (G) | SDS in soft water | | Liquid Tide HE In soft water | | Liquid Tide HE In hard water | | Powder Tide HE In hard water | |
|---|---|---|---|---|---|---|---|---|
| | Feed (retentate) | Permeate | Feed (retentate) | permeate | Feed (retentate) | permeate | Feed (retentate) | permeate |
| 10 | 1384 | 525 | 1029 | 753 | 1083 | 828 | 583 | 175 |
| 7.5 | 1727 | 559 | 1094 | 777 | 1136 | 778 | 708 | 171 |
| 5 | 2270 | 673 | 1256 | 831 | 1290 | 789 | 1049 | 190 |
| 2.5 | 3349 | 1023 | 1572 | 967 | 1706 | 834 | 1500 | 214 |

TABLE 8

Second Membrane TOC Analysis

| TOC (ppm) | Liquid Tide HE In soft water | | SDS in soft water | |
|---|---|---|---|---|
| Feed volume (G) | Feed (retentate) | Permeate | Feed (retentate) | permeate |
| 10 | 999 | 973 | 2083 | 1878 |
| 7.5 | 1053 | 971 | 2148 | 1805 |
| 5 | 1096 | 993 | 2371 | 1872 |
| 2.5 | 1130 | 1016 | 2612 | 1914 |

The active matter and TOC measurements are qualitatively consistent even though the TOC measurement detects citrate in liquid Tide™ detergent and nonionic surfactant in detergent that the active matter does not. The qualitative trend between active matter and TOC for the SDS is not as consistent as for the other samples (the SDS permeate samples developed cloudiness while awaiting AM titration analysis). All detergent samples showed increased retention of surfactant as the original 10 gallon volume was reduced by the removal of permeate from the system. After removal of about 75% of the 10 gallon volume as permeate, the powder Tide™ detergent samples showed a more extreme case of surfactant retention in the feed/retentate solution (the active matter and TOC ratio of feed to permeate (F/P) reached a value of 8.68 and 7.01, respectively).

TABLE 9

Feed to Permeate Ratio

| Feed volume (G) | SDS in soft water First membrane | | Liquid Tide HE In soft water First membrane | | Liquid Tide HE In hard water First membrane | | Powder Tide HE In hard water First membrane | | Liquid Tide HE In soft water Second membrane F/P (TOC) | SDS in soft water Second membrane F/P (TOC) |
|---|---|---|---|---|---|---|---|---|---|---|
| | F/P (AM) | F/P (TOC) | F/P (AM) | F/P (TOC) | F/P (AM) | F/P (TOC) | F/P (AM) | F/P (TOC) | | |
| 10 | 3.42 | 2.64 | 1.59 | 1.37 | 1.64 | 1.31 | 3.42 | 3.33 | 1.03 | 1.11 |
| 7.5 | 2.78 | 3.09 | 1.65 | 1.41 | 1.59 | 1.46 | 5.41 | 4.14 | 1.08 | 1.19 |
| 5 | 2.46 | 3.37 | 1.9 | 1.51 | 1.86 | 1.63 | 6.88 | 5.52 | 1.10 | 1.27 |
| 2.5 | 2.16 | 3.27 | 1.84 | 1.63 | 2.47 | 2.05 | 8.68 | 7.01 | 1.11 | 1.36 |

The precipitate particles present in the Liquid Tide™ detergent with hardness samples showed a lower degree of effect in increasing the F/P ratio of the surfactant With the second membrane, the surfactant retention was also increased as the volume of feed solution reduced but less amount of surfactant was retained in the feed/retentate solution.

The presence of particulate matter had a marked effect on membrane flux and on surfactant concentration in the permeate. Both relative flux and the permeate surfactant concentrations were lowered in the presence of particulates. Both membranes acted more like an ultrafiltration membrane than like a microfiltration membrane. The reduced water and active matter flux observed when using hard water and/or powder detergent containing insoluble zeolite particles indicates that use of liquid detergent and soft water is a preferred embodiment of the invention.

EXAMPLE IV

Five sets of detergency experiments (details discussed below) were performed using a Maytag Neptune™ horizontal axis wash vessel. In each detergency experiment, five pounds of freshly scoured cotton fabric on which test strips were pinned was used to simulate the clothes.

In order to scour the fabric, five pounds of fabric (size of each piece: 36 inch×36 inch) were loosely placed into the Kenmore™ portable washer. Then, 50.4 g of STPP was added to the wash. The wash vessel was set at regular. The machine was stopped manually after the wash cycle and before the rinse cycle. Again, 50.4 g. of STPP was added into the washer for the second, third, and fourth wash cycles. For the fifth cycle, the machine was allowed to go through all the steps, including rinse and spin cycle. The fabric was transferred to the dryer before storing in a clean plastic bag.

Warm water (about 40° C.) was used for the wash cycle. Cold water (about 27° C.) was used for the three rinse cycles. The Neptune™ wash vessel was set to whites for fabrics and the wash cycle was carried out at regular (normal wash) mode. The wash water and rinse water effluents were collected separately in holding tanks after passing through a wire mesh (used for lint separation). The wire mesh was not used for the set 1 experiments. The reflectance of washed swatches was measured using a Hunterlab™ spectrophotometer. For all washes, the standard dosage of detergent for a normal wash was used and the detergent dosage was not adjusted during the sequence. The microfiltration membrane unit was cleaned by flushing it with tap water for several minutes between rinse (set 3–5) and wash (set 1–5) filtrations, and the wash sequences for each set. However, it was back flushed with tap water between the sets. One membrane was used to filter both rinse and wash waters (set 3, 4, and 5).

Initial experiments used powder Tide HE™ detergent for washing in water with added Ca/Mg hardness to the extent of 150 ppm. Liquid fabric softener (Downy™ softener) was also added. Later washes in this sequence employed liquid Tide HE™ detergent with soft water and no added fabric softener. This change was prompted by the expectation that soft water would improve washing effectiveness and by the detrimental effect of the zeolite builder in powdered Tide™ detergent on filtration processes.

A washing sequence typically included a total of six washes and five filtrations. The first wash in each sequence used fresh water. Subsequent washes used filtered/recycled water for wash and rinse steps. Standard test strips (e.g., EMPA 103) and redeposition swatches were included in each wash and examined by reflectance measurements to determine washing effectiveness. Fluid samples from the wash, rinse, and filtration steps were analyzed for active matter (detergent) and TOC.

Filtration of the wash/rinse fluids was done with a Stork™ 0.1-micron microfiltration membrane. Several experiments were carried out to determine filtration effectiveness in the absence of wash-produced soil/particulates. These experiments utilized either liquid or powdered Tide™ detergent or a sodium dodecyl sulfate mixture.

The use of chlorine bleach or peroxygen bleach was also assessed in several washing procedures. Chlorine bleach seemed to be most effective with the peroxygen bleach showing poorer performance even at elevated washing temperatures.

In each detergency experiment, two test strips of "EMPA 103" were used. A bleached swatch of EMPA 103 was put through the sequence of six washes to examine redeposition.

The following are the sets of conditions used:

Set 1: Hard water; powdered detergent; wash temperature about 40° C., rinse temperature-room temperature; 60% wash water recovery after microfiltration; 60% rinse water recovery after bag filter (0.45 micron pore size) filtration; rinse-added fabric softener. Six runs were made.

FIG. 1 shows the process flow diagram for the apparatus of Set 1. The hot water inlet 22 was used as the feed for the wash step and the cold water inlet 24 was for the rinse step. The hardness level of the water in wash water feed tank 42 was adjusted to 150 ppm as $CaCO_3$ and water was heated to about 40° C. with a steam coil. A half cup (about 87.5 g) of Tide HE™ detergent and a standard dosage (about 28.27 g) of Downy™ fabric softener were placed in the wash and rinse dispensers. After the wash cycle, the wash water effluent (about 3.8 gallons) was collected in a holding tank 32 where the wash water effluent was mixed with about 0.7 gallon of fresh hard water (150 ppm as $CaCO_3$) prior to its filtration. Three rinse water effluents (about 16 gallons) were transferred to a holding tank 32.

The wash effluent held in holding tank 32 was filtered with the tubular 0.1-micron micro filtration filter 36. The permeate, or solution passing through the filter 36 (about 3.75 gallons), was passed to tank 42 mixed with about 1.25 gallon of fresh hard water (150 ppm as $CaCO_3$), and reused for the next wash. The retentate, or solution not passing through the filter 36, after circulating to get a sufficient volume was held in holding tank 32 and was discarded (about 0.75 gallons) upon completion of filtration.

Although the initial plan for the rinse effluent was dilution and reuse, fabric and other particles plugged the screen on washer inlet line 24, so a 0.45 micron bag filter 54 had to be used to treat the rinse water prior to dilution and reuse. The rinse effluent 46 (about 16 gallons) was transferred from holding tank 48 to nixing tank 52 where it was mixed with 10 gallon of fresh hard water and treated with the bag filter 54.

A total of six washes and five filtration experiments were performed. Water samples collected from several points of the unit were analyzed for TOC, IC (wash influent, wash effluent, wash permeate, wash retentate, rinse influent, and rinse effluent) and for active matter (sulfate/sulfonate) content (wash effluent, first rinse, wash permeate, and wash retentate). The two test strips after the wash were air-dried before measuring reflectance using the Hunterlab™ spectrophotometer at the specular excluded reflectance mode. Swatch #8 or a bleached swatch of each test strip was cut out from the test strips and were used as "redeposition swatch."

Active matter titration was used to determine the anionic surfactant (both sulfonates and sulfates) concentrations and the results are shown in FIGS. 23–26.

For the Set 1 and 2 experiments, active matter of the retentate was approximately 12.4 times that of the permeate, compared to a factor of 8.7 in blank filtration of powder Tide HE detergent in hard water. The following are the active matter results for Set 1:

TABLE 10

Active matter balance of set 1 water samples

| Wash | Water samples | Active Matter (ppm) | Volume (gal) | Active Matter (g) | Amount of active matter retained On clothes after wash (g)* | In filtration unit (g)** |
|---|---|---|---|---|---|---|
| 1 | Detergent dosage | 929.326288 | 5 | 17.59 | | |
|   | Wash water effluent | 555.49 | 3.8 | 7.99 | 9.60 | 3.52 |
|   | First rinse | 88.58 | 5.5 | 1.84 | | |
|   | Permeate (wash) | 169.85 | 3.75 | 2.41 | | |
|   | Retentate (wash) | 723.78 | 0.75 | 2.05 | | |
| 2 | Wash water effluent | 578.89 | 3.8 | 8.33 | | |
|   | First rinse | 118.06 | 5.5 | 2.46 | 11.67 | 2.81 |
|   | Permeate (wash) | 176.83 | 3.75 | 2.51 | | |
|   | Retentate (wash) | 1058.22 | 0.75 | 3.00 | | |
| 3 | Wash water effluent | 601.84 | 3.8 | 8.66 | | |
|   | First rinse | 160.58 | 5.5 | 3.34 | 11.44 | 3.04 |
|   | Permeate (wash) | 136.27 | 3.75 | 1.93 | | |
|   | Retentate (wash) | 1297.69 | 0.75 | 3.68 | | |
| 4 | Wash water effluent | 582.85 | 3 | 6.62 | | |
|   | First rinse | 160.38 | 5.5 | 3.34 | 12.90 | 0.98 |
|   | Permeate (wash) | 111.39 | 3.75 | 1.58 | | |
|   | Retentate (wash) | 1430.79 | 0.75 | 4.06 | | |
| 5 | Wash water effluent | 589.05 | 3.8 | 8.47 | | |
|   | First rinse | 141.98 | 5.5 | 2.96 | 10.70 | 2.77 |
|   | Permeate (wash) | 115.77 | 3.75 | 1.64 | | |
|   | Retentate (wash) | 1430.22 | 0.75 | 4.06 | | |

TABLE 10-continued

Active matter balance of set 1 water samples

| Wash | Water samples | Active Matter (ppm) | Volume (gal) | Active Matter (g) | Amount of active matter retained On clothes after wash (g)* | Amount of active matter retained In filtration unit (g)** |
|---|---|---|---|---|---|---|
| 6 | Wash water effluent | 544.92 | 3.8 | 7.84 | | |
|   | First rinse | 152.36 | 5.5 | 3.17 | 11.39 | |

*Number represents the difference between active matter content of wash water influent with added dose and wash water effluent
**Number represents the difference between active matter content of filtration unit upstream and downstream

TABLE 11

Active matter retained on clothes and in the membrane unit (set 1)

| Wash # | Amount of active matter retained on clothes after wash (%)*** | Amount of active matter retained in filtration unit (%)**** | AM Recycled with wash permeate % |
|---|---|---|---|
| 1 | 54.57 | 44.11 | 13.71 |
| 2 | 58.37 | 33.78 | 12.55 |
| 3 | 56.93 | 35.10 | 9.62 |
| 4 | 66.10 | 14.74 | 8.10 |
| 5 | 55.80 | 34.89 | 8.57 |
| 6 | 59.24 | | |

***numbers represent as percent difference between active matter content of wash water influent with added dose and wash water effluent
****numbers represent as percent difference between active matter content of filtration unit upstream and down stream Set 2: Hard water; powdered detergent; wash temperature about 40° C., rinse temperature-room temperature; 60% wash water recovery after microfiltration; 80 to 95% rinse water recovery after bag filter filtration; rinse-added fabric softener. Nine runs were made.

Experimental conditions for set 2 were similar to those of set 1 with a few exceptions, shown in the configuration of FIG. 2, such as all three rinse effluents were collected in the rinse tank 52, which had an initial content of 20 gal. fresh hard water, and reused without adding fresh make up water and using bag filter. Fresh hard water (about 2 gallons) was added to the wash effluent when the wash effluent was in tank 32 prior to filtration. A total of nine washes and eight filtration experiments were performed.

Active matter titration was used to determine the anionic surfactant (both sulfonates and sulfates) concentrations, with the following results:

TABLE 12

Active matter balance of set 2 water samples

| Wash | Water samples | Active Matter (ppm) | Volume (gal) | Active Matter (g) | Amount of active matter retained on clothes after wash (g)* | Amount of active matter retained in filtration unit (g)** |
|---|---|---|---|---|---|---|
| 1 | Wash water influent | 929.326288 | 5 | 17.59 | | |
|   | Wash water effluent | 350.98 | 3.8 | 5.05 | 12.54 | 1.75 |
|   | Rinse effluent | 37.34 | 16 | 2.26 | | |
|   | Permeate (wash) | 85.74 | 5 | 1.62 | | |
|   | Retentate (wash) | 591.33 | 0.75 | 1.68 | | |
| 2 | Wash water effluent | 423.89 | 3.8 | 6.10 | | |
|   | Rinse effluent | 50.09 | 16 | 3.03 | 13.11 | 1.30 |
|   | Permeate (wash) | 88.78 | 5 | 1.68 | | |
|   | Retentate (wash) | 1099.11 | 0.75 | 3.12 | | |
| 3 | Wash water effluent | 434.51 | 3.8 | 6.25 | | |
|   | Rinse effluent | 53.72 | 16 | 3.25 | 13.02 | 1.48 |
|   | Permeate (wash) | 90.55 | 5 | 1.71 | | |
|   | Retentate (wash) | 1076.53 | 0.75 | 3.06 | | |
| 4 | Wash water effluent | 434.84 | 3.8 | 6.25 | | |
|   | Rinse effluent | 70.21 | 16 | 4.25 | 13.05 | 1.20 |
|   | Permeate (wash) | 105.52 | 5 | 2.00 | | |
|   | Retentate (wash) | 1077.24 | 0.75 | 3.06 | | |
| 5 | Wash water effluent | 454.73 | 3.8 | 6.54 | | |
|   | Rinse effluent | 93.06 | 16 | 5.64 | 13.04 | 1.61 |
|   | Permeate (wash) | 87.53 | 5 | 1.66 | | |
|   | Retentate (wash) | 1154.01 | 0.75 | 3.28 | | |
| 6 | Wash water effluent | 567.67 | 4 | 8.59 | | |
|   | Rinse effluent | 109.82 | 16 | 6.65 | 10.65 | 3.56 |
|   | Permeate (wash) | 103.94 | 5 | 1.97 | | |
|   | Retentate (wash) | 1081.44 | 0.75 | 3.07 | | |

TABLE 12-continued

Active matter balance of set 2 water samples

| Wash | Water samples | Active Matter (ppm) | Volume (gal) | Active Matter (g) | Amount of active matter retained on clothes after wash (g)* | in filtration unit (g)** |
|---|---|---|---|---|---|---|
| 7 | Wash water effluent | 578.89 | 3.8 | 8.33 | | |
|  | Rinse effluent | 119.58 | 16 | 7.24 | 11.23 | 2.65 |
|  | Permeate (wash) | 102.46 | 5 | 1.94 | | |
|  | Retentate (wash) | 1316.00 | 0.75 | 3.74 | | |
| 8 | Wash water effluent | 585.41 | 3.8 | 8.42 | | |
|  | First rinse | 126.30 | 16 | 7.65 | 11.11 | 2.48 |
|  | Permeate (wash) | 107.27 | 5 | 2.03 | | |
|  | Retentate (wash) | 1375.86 | 0.75 | 3.91 | | |
| 9 | Wash water effluent | 603.15 | 3.8 | 8.68 | | |
|  | Rinse effluent | 133.32 | 16 | 8.07 | 10.94 | 2.48 |

TABLE 13

Active matter retained on clothes and in the membrane unit (set 2)

| wash # | Amount of active matter retained in | | AM Recycled with wash permeate (%) |
|---|---|---|---|
|  | Clothes after wash (%)*** | Filtration Unit (%)**** |  |
| 1 | 71.30 | 34.60 | 9.23 |
| 2 | 55.37 | 21.27 | 8.75 |
| 3 | 54.61 | 23.68 | 8.89 |
| 4 | 54.72 | 19.18 | 10.35 |
| 5 | 54.06 | 24.59 | 8.46 |
| 6 | 40.67 | 41.39 | 10.22 |
| 7 | 43.33 | 31.84 | 9.92 |
| 8 | 42.70 | 29.50 | 10.40 |
| 9 | 41.67 | 28.58 | 11.04 |

Set 3: Soft water; liquid detergent; wash temperature about 40° C., rinse temperature-room temperature; 60% wash water recovery after microfiltration; 80% rinse water recovery after microfiltration; no fabric softener added; "Surfactant sensitive" swatches added in addition to other swatches; UV filter used in reflectance measurements to avoid fluorescent brighteners skewing results. Six runs were made.

The experimental flow chart of set 3 is shown in FIG. 3. Liquid Tide HE™ detergent was used at the dosage for a normal wash (about 98 g). For this set, soft tap water was used for wash and rinse cycles. Fabric softener was not used.

Besides EMPA 103, two sets of three soiled swatches (EMPA 116, Cotton 400, and Cotton PEDP 7435 WRL) were washed. Reflectance of swatches before and after the wash was measured with the Hunterlab spectrophotometer at the specular included reflectance mode. The UV filter was also included during the reflectance measurements in order to eliminate the effect of detergent brightener on the reflectance.

Six washes and five filtration experiments were performed. The rinse effluent (about 16 gallons) was filtered with the microfiltration unit and the permeate stream (about 14 gallons) was collected in the rinse water holding tank. Three gallons of fresh soft water was added to the rinse effluent permeate before it was reused for the next wash. The same microfiltration unit was used to treat the wash water effluent in FIG. 3.

For the set 3 and 4 experiments, active matter of the retentate is approximately 9 times that of the permeate, compared to a factor of 2 in blank filtration of liquid Tide HE™ detergent in soft water. Surfactant emulsifying oily soil and adsorption on particulate soil could explain the increase in retained surfactant concentration in the retentate streams. However, the active matter content of the retentate is approximately three times that of the permeate for set 5.

The following are the active matter results for Set 3:

TABLE 14

Active matter balance of set 3 water samples

| Wash | Water samples | Active Matter (ppm) | Volume (gal) | Active Matter (g) | Amount of active matter retained on clothes after (wash) (rinse) (g)* | in filtration unit (wash) (rinse) (g)** |
|---|---|---|---|---|---|---|
| 1 | Wash water influent | 1180.660502 | 5 | 22.34 | | |
|  | Wash water effluent | 694.09 | 3.8 | 9.98 | 12.36 | 4.53 |
|  | Rinse effluent | 53.85 | 16 | 3.26 | 9.10 | |
|  | Permeate (wash) | 98.94 | 5 | 1.87 | | |
|  | Retentate (wash) | 1181.14 | 0.8 | 3.58 | | |
|  | Permeate | 24.76 | 14 | 1.31 | | 1.26 |

TABLE 14-continued

Active matter balance of set 3 water samples

| Wash | Water samples | Active Matter (ppm) | Volume (gal) | Active Matter (g) | Amount of active matter retained on clothes after (wash) (rinse) (g)* | in filtration unit (wash) (rinse) (g)** |
|---|---|---|---|---|---|---|
|  | (rinse) |  |  |  |  |  |
|  | Retentate (rinse) | 90.81 | 2 | 0.69 |  |  |
| 2 | Wash water effluent | 825.69 | 3.8 | 11.88 |  |  |
|  | Rinse effluent | 98.05 | 16 | 5.94 | 12.34 | 4.90 |
|  | Permeate (wash) | 151.87 | 5 | 2.87 | 7.71 |  |
|  | Retentate (wash) | 1355.98 | 0.8 | 4.11 |  |  |
|  | Permeate (rinse) | 70.37 | 14 | 3.73 |  | 0.84 |
|  | Retentate (rinse) | 180.50 | 2 | 1.37 |  |  |
| 3 | Wash water effluent | 919.16 | 3.8 | 13.22 |  |  |
|  | Rinse effluent | 115.09 | 16 | 6.97 | 12.00 | 5.81 |
|  | Permeate (wash) | 165.25 | 5 | 3.13 | 8.76 |  |
|  | Retentate (wash) | 1416.09 | 0.8 | 4.29 |  |  |
|  | Permeate (rinse) | 81.39 | 14 | 4.31 |  | −0.03 |
|  | Retentate (rinse) | 354.38 | 2 | 2.68 |  |  |
| 4 | Wash water effluent | 780.00 | 3.8 | 11.22 |  |  |
|  | Rinse effluent | 141.20 | 16 | 8.55 | 14.25 | 3.90 |
|  | Permeate (wash) | 159.67 | 5 | 3.02 | 10.01 |  |
|  | Retentate (wash) | 1419.29 | 0.8 | 4.30 |  |  |
|  | Permeate (rinse) | 103.65 | 14 | 5.49 |  | 0.43 |
|  | Retentate (rinse) | 347.60 | 2 | 2.63 |  |  |
| 5 | Wash water effluent | 982.58 | 3.8 | 14.13 |  |  |
|  | Rinse effluent | 155.39 | 16 | 9.41 | 11.23 | 4.74 |
|  | Permeate (wash) | 222.67 | 5 | 4.21 | 7.32 |  |
|  | Retentate (wash) | 1709.00 | 0.8 | 5.17 |  |  |
|  | Permeate (rinse) | 112.21 | 14 | 5.95 |  | 0.30 |
|  | Retentate (rinse) | 418.56 | 2 | 3.17 |  |  |
| 6 | Wash water effluent | 877.810023 | 3.8 | 12.63 | 13.93 |  |
|  | rinse water effluent | 151.8028931 | 16 | 9.19 | 10.69 |  |

The follow table shows the active matter retained on clothes and in the membrane unit.

TABLE 15

Active matter retained on clothes and in the membrane unit (Set 3)

| | Amount of active matter retained | | | |
|---|---|---|---|---|
| wash # | On clothes after wash (%)*** | In filtration Unit (%)-wash**** | In filtration Unit (%), rinse**** | AM Recycled with wash permeate % |
| 1 | 55.32 | 45.42 | 38.69 | 8.38 |
| 2 | 50.96 | 41.23 | 14.20 | 11.87 |
| 3 | 47.58 | 43.91 | −0.37 | 12.40 |
| 4 | 55.96 | 34.76 | 5.00 | 11.86 |
| 5 | 44.29 | 33.57 | 3.14 | 16.61 |
| 6 | 52.46 | | | |

Set 4: Soft water; liquid detergent; wash temperature about 40° C., rinse temperature-room temperature; 60% wash water recovery after microfiltration; 80% rinse water recovery after microfiltration; integration of rinse and wash water very systems-retentate from rinse water filtration was used instead of fresh water to the wash water recycle system; no fabric softener added; six runs were made.

The following are the active matter results for Set 4:

TABLE 16

Active matter of set 4 water samples

| | | | | | Amount of active matter retained | |
|---|---|---|---|---|---|---|
| Wash | Water samples | Active Matter (ppm) | Volume (gal) | Active Matter (g) | on clothes after (wash) (rinse) (g) | in filtration unit (wash) (rinse) (g) |
| 1 | Wash water influent | 1180.660502 | 5 | 22.34 | | |
| | Wash water effluent | 703.67 | 3.8 | 10.12 | 12.22 | 4.63 |
| | Rinse effluent | 59.90 | 16 | 3.63 | 8.60 | |
| | Permeate (wash) | 132.44 | 5 | 2.51 | | |
| | Retentate (wash) | 1190.03 | 0.8 | 3.60 | | |
| | Permeate (rinse) | 28.00 | 14 | 1.48 | | 1.53 |
| | Retentate (rinse) | 81.31 | 2 | 0.62 | | |
| 2 | Wash water effluent | 879.65 | 3.8 | 12.65 | | |
| | Rinse effluent | 86.80 | 16 | 5.26 | 12.20 | 3.89 |
| | Permeate (wash) | 174.10 | 5 | 3.29 | 8.43 | |
| | Retentate (wash) | 1805.08 | 0.8 | 5.47 | | |
| | Permeate (rinse) | 83.51 | 14 | 4.43 | | |
| | Retentate (rinse) | 0.00 | 2 | | | |
| 3 | Wash water effluent | 716.30 | 3.8 | 10.30 | | |
| | Rinse effluent | 120.56 | 16 | 7.30 | 15.34 | 2.70 |
| | Permeate (wash) | 212.67 | 5 | 4.02 | 12.46 | |
| | Retentate (wash) | 1897.44 | 0.8 | 5.75 | | |
| | Permeate (rinse) | 75.08 | 14 | 3.98 | | 1.15 |
| | Retentate (rinse) | 286.35 | 2 | 2.17 | | |
| 4 | Wash water effluent | 720.24 | 3.8 | 10.36 | | |
| | Rinse effluent | 123.63 | 16 | 7.49 | 16.01 | 1.78 |
| | Permeate (wash) | 234.65 | 5 | 4.44 | 12.50 | |

TABLE 16-continued

Active matter of set 4 water samples

| Wash | Water samples | Active Matter (ppm) | Volume (gal) | Active Matter (g) | Amount of active matter retained on clothes after (wash) (rinse) (g) | Amount of active matter retained in filtration unit (wash) (rinse) (g) |
|---|---|---|---|---|---|---|
|  | Retentate (wash) | 2116.87 | 0.8 | 6.41 |  |  |
|  | Permeate (rinse) | 84.74 | 14 | 4.49 |  | 0.73 |
|  | Retentate (rinse) | 299.95 | 2 | 2.27 |  |  |
| 5 | Wash water effluent | 767.02 | 3.8 | 11.03 |  |  |
|  | Rinse effluent | 124.32 | 16 | 7.53 | 15.75 | 2.34 |
|  | Permeate (wash) | 238.17 | 5 | 4.51 | 12.71 |  |
|  | Retentate (wash) | 2148.57 | 0.8 | 6.51 |  |  |
|  | Permeate (rinse) | 94.14 | 14 | 4.99 |  | 0.22 |
|  | Retentate (rinse) | 306.79 | 2 | 2.32 |  |  |
| 6 | Wash water effluent | 982.0709357 | 3.8 | 14.13 | 12.73 |  |
|  | rinse water effluent | 137.2744571 | 16 | 8.31 | 9.40 |  |

The following table shows the active matter retained on clothes and in the membrane unit.

TABLE 17

Active matter retained on clothes and in the membrane unit (Set 4)

| wash # | Amount of active matter retained in Clothes after wash (%)*** | Filtration Unit (%)-wash**** | Filtration Unit (%), rinse**** | AM Recycled with wash permeate % |
|---|---|---|---|---|
| 1 | 54.70 | 45.71 | 42.12 | 11.22 |
| 2 | 49.09 | 30.76 |  | 13.26 |
| 3 | 59.82 | 26.21 | 15.82 | 15.70 |
| 4 | 60.71 | 17.17 | 9.69 | 16.84 |
| 5 | 58.81 | 21.22 | 2.89 | 16.83 |
| 6 | 47.40 |  |  |  |

Set 5: Soft water; liquid detergent; wash temperature about 40° C., rinse temperature-room temperature; 60% wash water recovery after microfiltration; 80% rinse water recovery after microfiltration; integration of rinse and wash water recovery systems-retentate from rinse water filtration was used instead of fresh water feed to the wash water recycle system; chlorine bleach was used; dryer-added fabric softener sheets used. Six runs were made.

The following are the active matter results for Set 5:

TABLE 18

Active matter of set 5 water samples

| Wash | Water samples | Active Matter (ppm) | Volume (gal) | Active Matter (g) | On clothes after (wash) (rinse) (g) | In filtration unit (wash) (rinse) (g) |
|---|---|---|---|---|---|---|
| 1 | Wash water influent | 1180.660502 | 5 | 22.34 |  |  |
|  | Wash water effluent | 723.27 | 3.8 | 10.40 | 11.94 | −2.75 |
|  | Rinse effluent | 102.39 | 16 | 6.20 | 5.74 |  |

TABLE 18-continued

| | | Active matter of set 5 water samples | | | Amount of active matter retained | |
|---|---|---|---|---|---|---|
| Wash | Water samples | Active Matter (ppm) | Volume (gal) | Active Matter (g) | On clothes after (wash) (rinse) (g) | In filtration unit (wash) (rinse) (g) |
| | Permeate (wash) | 510.14 | 5 | 9.65 | | |
| | Retentate (wash) | 1531.71 | 0.8 | 4.64 | | |
| | Permeate (rinse) | 76.01 | 14 | 4.03 | | 1.03 |
| | Retentate (rinse) | 151.09 | 2 | 1.14 | | |
| 2 | Wash water effluent | 1068.69 | 3.8 | 15.37 | | |
| | Rinse effluent | 171.55 | 16 | 10.39 | 16.63 | −0.12 |
| | Permeate (wash) | 572.16 | 5 | 10.83 | 10.27 | |
| | Retentate (wash) | 1541.35 | 0.8 | 4.67 | | |
| | Permeate (rinse) | 157.71 | 14 | 8.36 | | −0.06 |
| | Retentate (rinse) | 276.84 | 2 | 2.10 | | |
| 3 | Wash water effluent | 1305.70 | 3.8 | 18.78 | | |
| | Rinse effluent | 238.64 | 16 | 14.45 | 14.39 | 5.62 |
| | Permeate (wash) | 437.89 | 5 | 8.29 | 8.30 | |
| | Retentate (wash) | 2976.71 | 0.8 | 9.01 | | |
| | Permeate (rinse) | 182.66 | 14 | 9.68 | | 0.63 |
| | Retentate (rinse) | 546.72 | 2 | 4.14 | | |
| 4 | Wash water effluent | 1359.88 | 3.8 | 19.56 | | |
| | Rinse effluent | 262.30 | 16 | 15.89 | 11.07 | 3.46 |
| | Permeate (wash) | 656.63 | 5 | 12.43 | 4.87 | |
| | Retentate (wash) | 2437.95 | 0.8 | 7.38 | | |
| | Permeate (rinse) | 224.56 | 14 | 11.90 | | 0.28 |
| | Retentate (rinse) | 490.14 | 2 | 3.71 | | |
| 5 | Wash water effluent | 1302.58 | 3.8 | 18.74 | | |
| | Rinse effluent | 285.29 | 16 | 17.28 | 16.04 | 4.33 |
| | Permeate (wash) | 566.58 | 5 | 10.72 | 10.66 | |
| | Retentate (wash) | 2095.18 | 0.8 | 6.34 | | |
| | Permeate (rinse) | 343.74 | 14 | 18.21 | | −3.60 |
| | Retentate (rinse) | 351.57 | 2 | 2.66 | | |
| 6 | Wash water effluent | 1419.38 | 3.8 | 20.42 | 12.65 | |
| | rinse water effluent | 344.22 | 16 | 20.85 | 10.02 | |

The following shows the active matter retained on clothes and in the membrane unit.

TABLE 19

Active matter retained on clothes and in the membrane unit (Set 5)

| wash # | Clothes after wash (%)*** | Amount of active matter retained in Filtration Unit (%)-wash**** | Filtration Unit (%), rinse**** | AM Recycled with wash permeate % |
|---|---|---|---|---|
| 1 | 53.44 | −26.4 | 16.60 | 43.21 |
| 2 | 51.96 | 0.28 | −0.61 | 33.84 |
| 3 | 43.39 | 29.91 | 4.39 | 24.98 |
| 4 | 36.15 | 17.69 | 1.73 | 40.57 |
| 5 | 46.12 | 23.11 | −20.83 | 30.84 |
| 6 | 38.26 | | | |

Experimental conditions for set 4 and 5 were similar to those of set 3. However, the wash water effluent was integrated with the rinse water retentate (2 gallons) prior to filtration as shown in FIG. 4. Hence, using fresh water as make-up water was eliminated for the wash water filtration loop.

The effect of using bleach (chlorine bleach, Ultra Clorox™ bleach) and fabric softener sheet on detergency was also studied in the set 5 experiments. The standard dosage of Ultra Clorox™ bleach for a normal load (¾ cup=180.66 g) was placed in the bleach dispenser of the wash vessel.

In addition to soiled swatches, four pieces of EMPA 223 (redeposition swatch) were used for each wash. Two pieces of EMPA 223 were dried with a fabric softener sheet (Bounce™ softener) and all the other swatches were dried using a dryer for ten or fifteen minutes without a fabric softener sheet. All swatches were ironed before the reflectance measurements. All pieces of EMPA 223 were recycled to the next wash. Rewashed redeposition swatches were dried with a fabric softener sheet only if they were previously dried with a fabric softener sheet.

As seen in FIGS. 7–16, the soil removal varies little over sequential washes for each set. Liquid Tide HE™ detergent in soft water (Sets 3 and 4) performs better soil removal than the powdered Tide HE™ detergent in hard water (Set 2) for red wine (15–20% better), blood-milk-carbon black (15–20% better), cocoa (4–9% better), blood (15–20% better), and carbon black-olive oil (5–8% better). However, the soil removal of immedial black and raw-unbleached with the use of liquid Tide HE™ detergent decreases about 1–3% and 2–5%, respectively. Residual chlorine bleach in the reused water stream (set 5) contributes to overall cleaning except for cocoa and bloodstains. The soil removal of immedial black increases about 60% (comparison between Set 5 and 4) with chlorine bleach for the first wash and increases further with the reuse of water (for example: 71% with the 6th wash). This is probably due to the presence of residual chlorine bleach in the reused water.

The Set 2 water reuse system when compared with the Set 1 water reuse system improves the soil removal of red wine by 10%, raw-unbleached by 4%, blood-milk-carbon black by 5%, and cocoa by 10% even though the wash conditions are same for both systems. Wash conditions and water reuse system for the set 3 and 4 were kept same but the rinse retentate was integrated with the wash effluent prior to filtration for the set 4 water reuse system (refer to FIGS. 2–3). This difference decreases the soil removal of red wine by 6%, raw-unbleached by 1%, blood-milk-carbon black by 2%, blood-milk-carbon black (smaller swatch) by 3–7.5%, dust sebum on cotton by 8–17%, dust sebum (on cotton PEDP) by 3–7%), and carbon black-olive oil by 2–5%.

Figure 21:
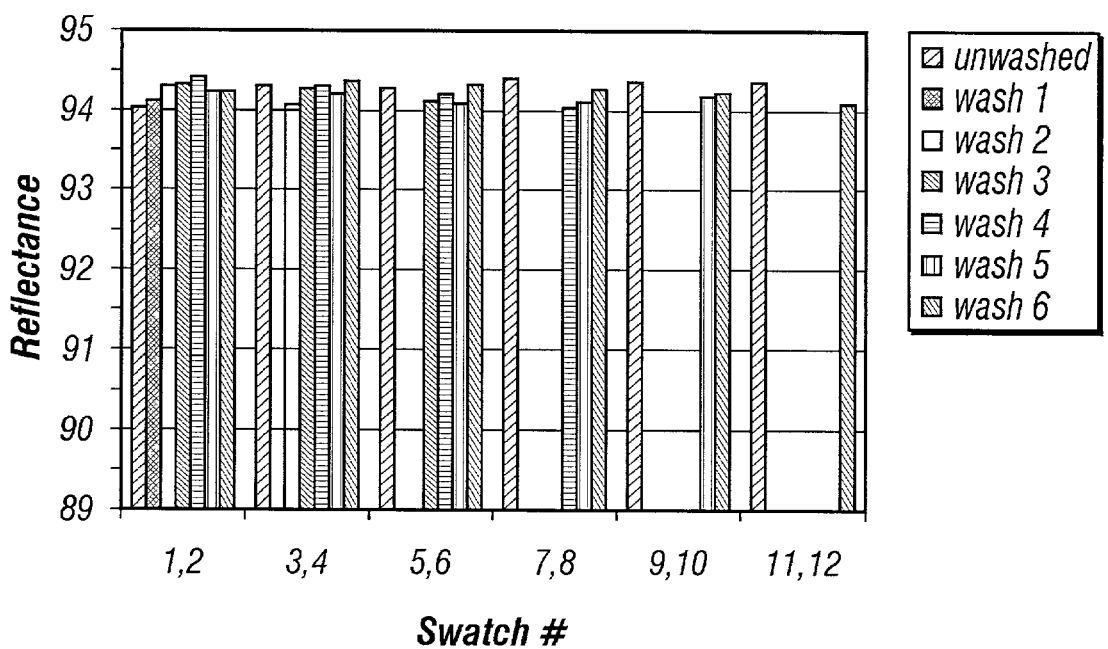
FIG. 21 is a chart of the reflectance of redeposition swatches dried without a fabric softener from Set 5.
Figure 22:
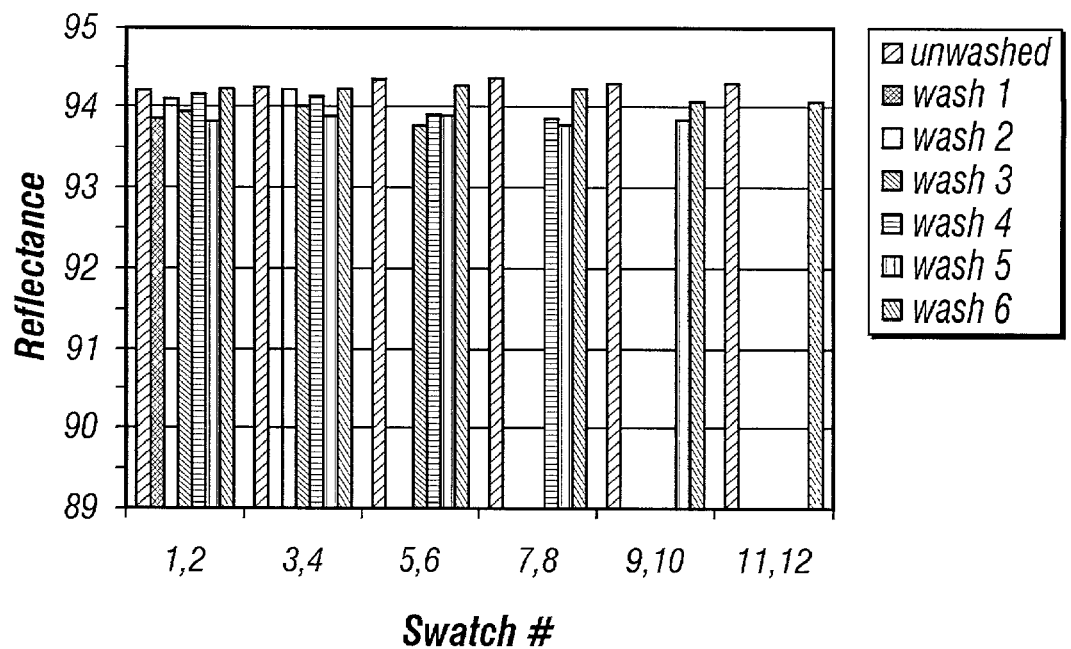
FIG. 22 is a chart of the reflectance of redeposition swatches dried without a fabric softener from Set 4.
Figure 23:
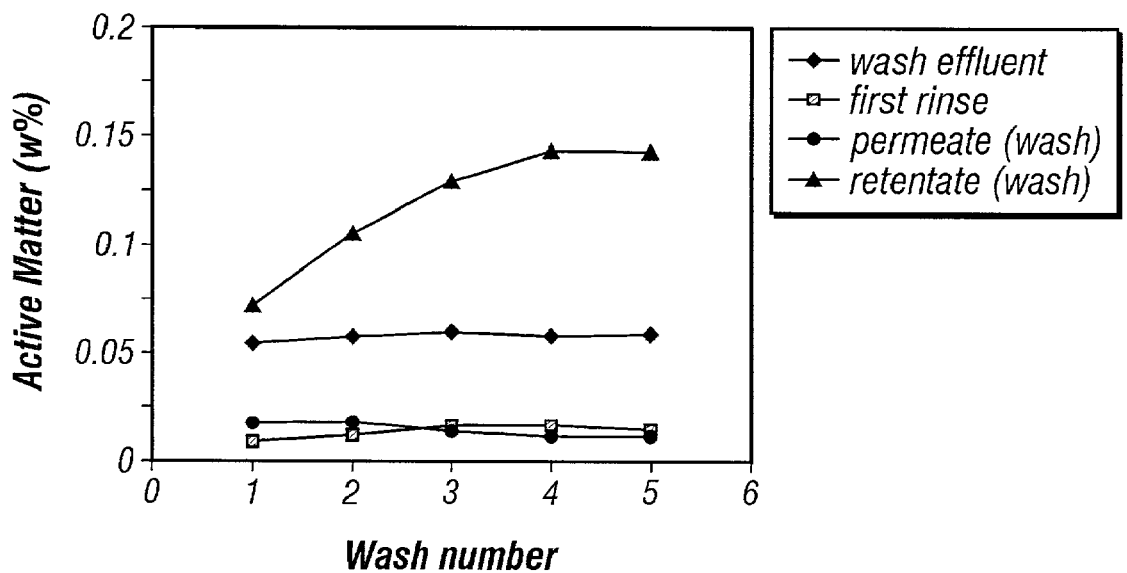
FIG. 23 is a graph reflecting the active matter analysis of water from subsequent washes for Set 1.
Figure 24:
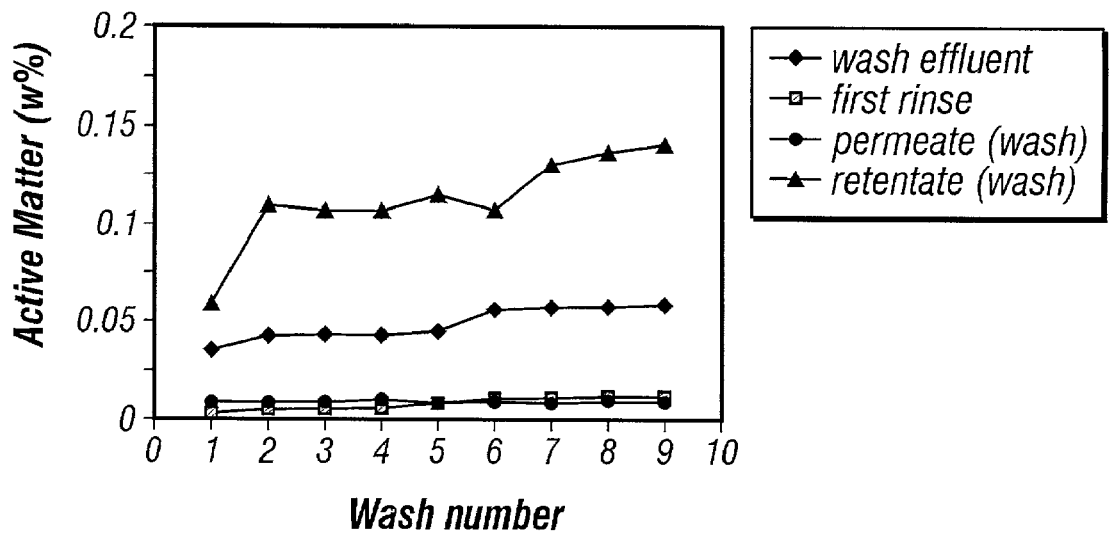
FIG. 24 is a graph reflecting the active matter analysis of water from subsequent washes for Set 2.
Figure 25:
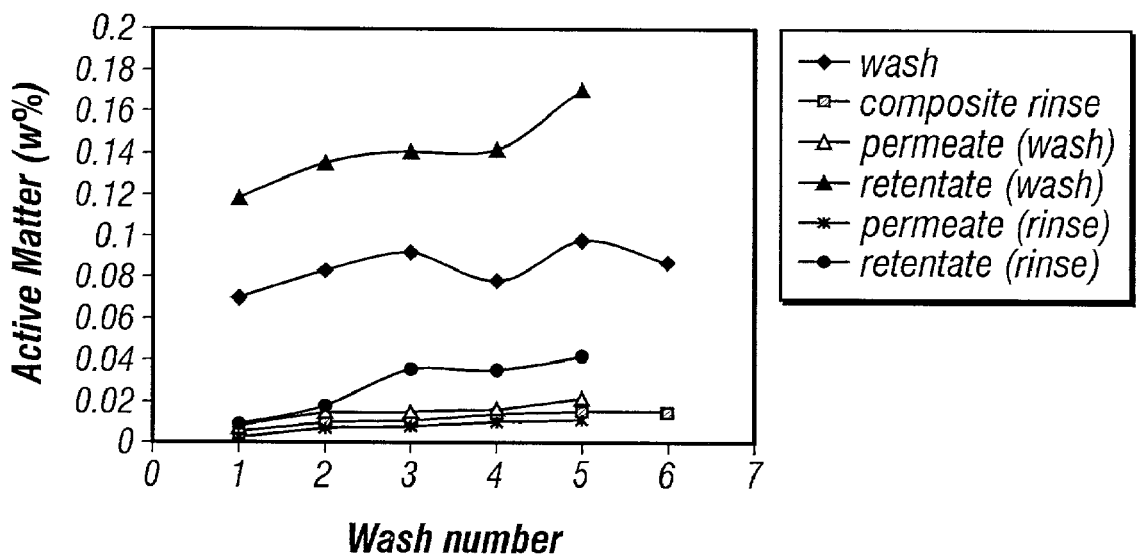
FIG. 25 is a graph reflecting the active matter analysis of water from subsequent washes for Set 3.
Figure 26:
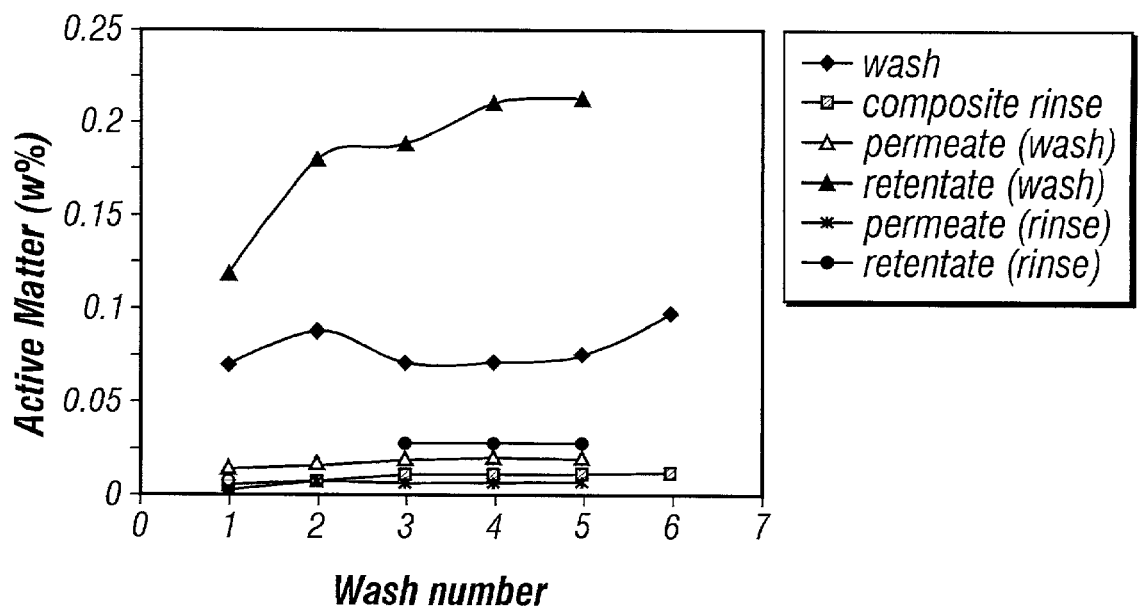
FIG. 26 is a graph reflecting the active matter analysis of water from subsequent washes for Set 4.
Figure 27:
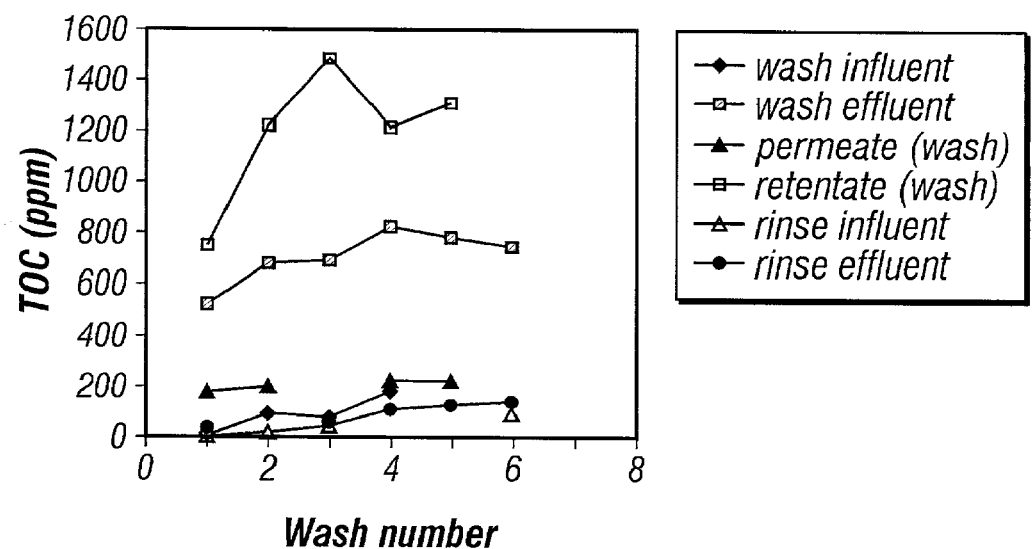
FIG. 27 is a graph reflecting the total organic carbon analysis of water from subsequent washes for Set 1.
Figure 28:
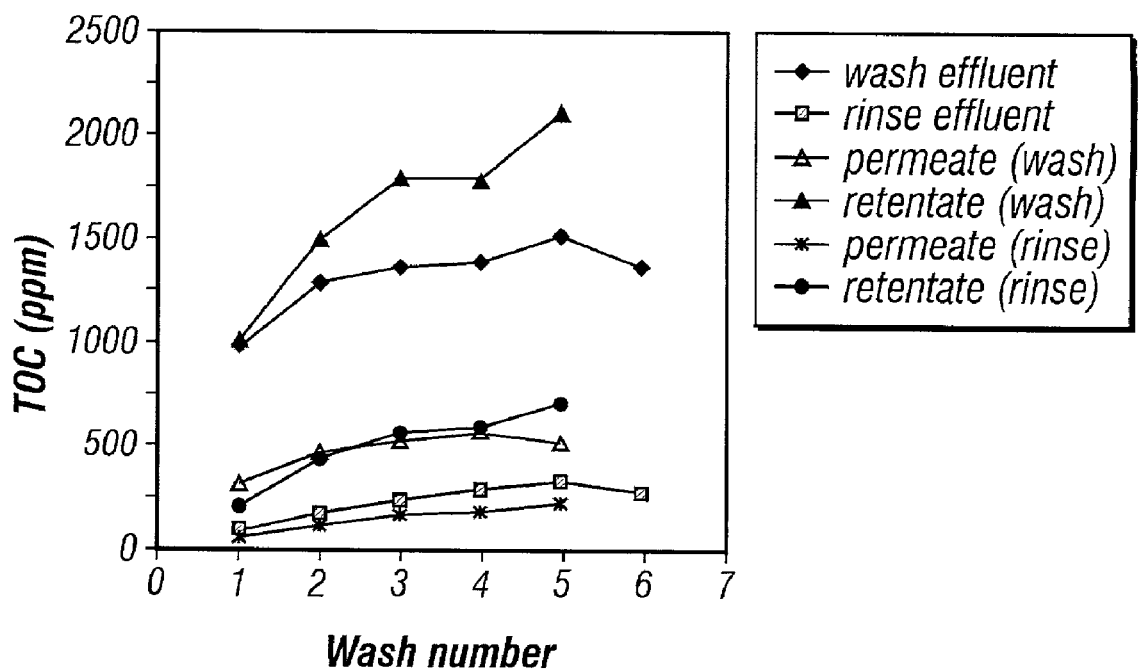
FIG. 28 is a graph reflecting the total organic carbon analysis of water from subsequent washes for Set 3.

The reflectance or brightness of the redeposition swatches decreases for all the sets except Set 5 as seen in FIGS. 17–22. For Set 5, reflectance of redeposition swatches appears nearly constant due to the presence of chlorine bleach in the system as shown in FIGS. 21–22.

Figure 29:
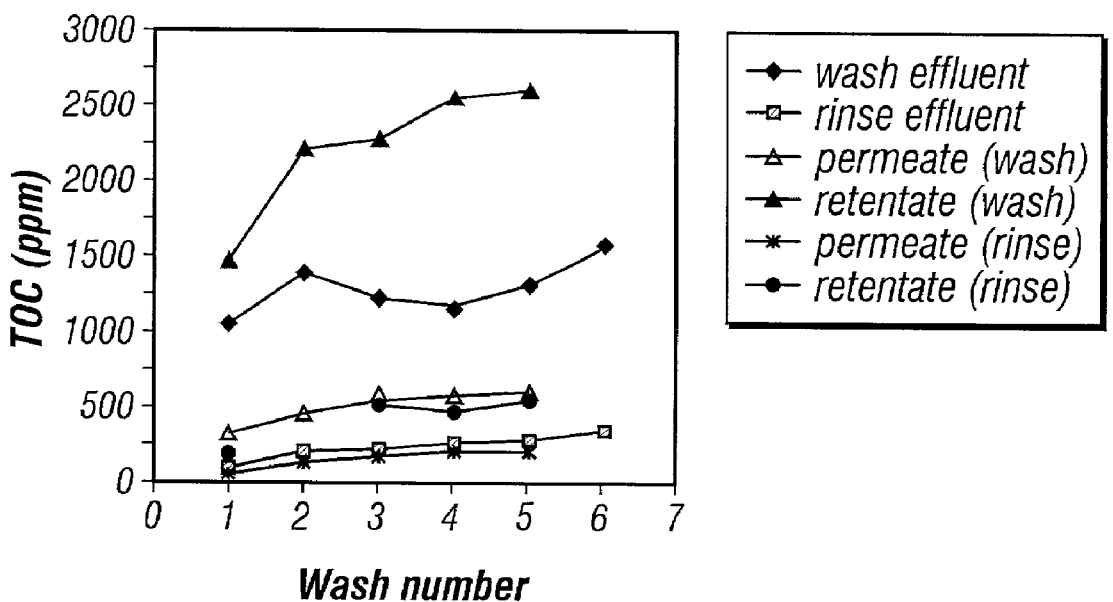
FIG. 29 is a graph reflecting the total organic carbon analysis of water from subsequent washes for Sets 4.
Figure 30:
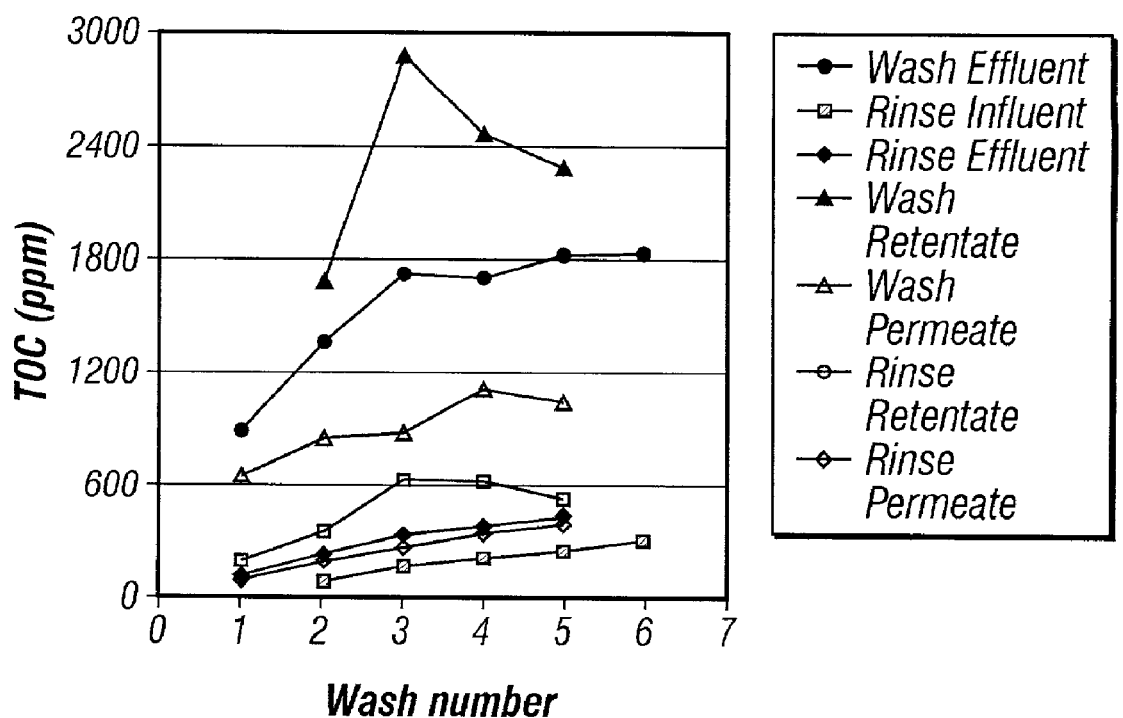
FIG. 30 is a graph reflecting the total organic carbon analysis of water from subsequent washes for Sets 5.

TOC amount of set 5 wash permeate is twice that of the set 4 wash permeate samples as shown in FIGS. 29–30. The presence of chlorine might explain the increase in surfactant concentration for set 5 wash permeate streams. Either the chlorine concentration in the feed stream is over the chlorine tolerance level of the membrane (membrane will be damaged) or chlorine disrupts the detergent gel layer formed on the membrane (more surfactant will pass through membrane). The active matter content increased with the number of runs because the permeate contained residual surfactant to which a new dose was added.

About 10% of the initial surfactant used is recovered for reuse when the wash water is treated with Set 1 and Set 2 filtration systems (powdered Tide HE™ detergent in hard water used). Set 3 wash filtration unit recovers about 12% of initial surfactant for reuse (liquid Tide HE™ detergent in soft water). Integrating rinse retentate with wash water effluent prior to filtration increases the recovery of initial surfactant to 17% (Set 4). Over 30% of the initial surfactant was recovered for reuse with the Set 5 experiments.

The TOC of the wash effluent in FIGS. 27–30 increased with number of runs faster than the active matter, probably due to accumulation of oily soil.

EXAMPLE V

Figure 31:
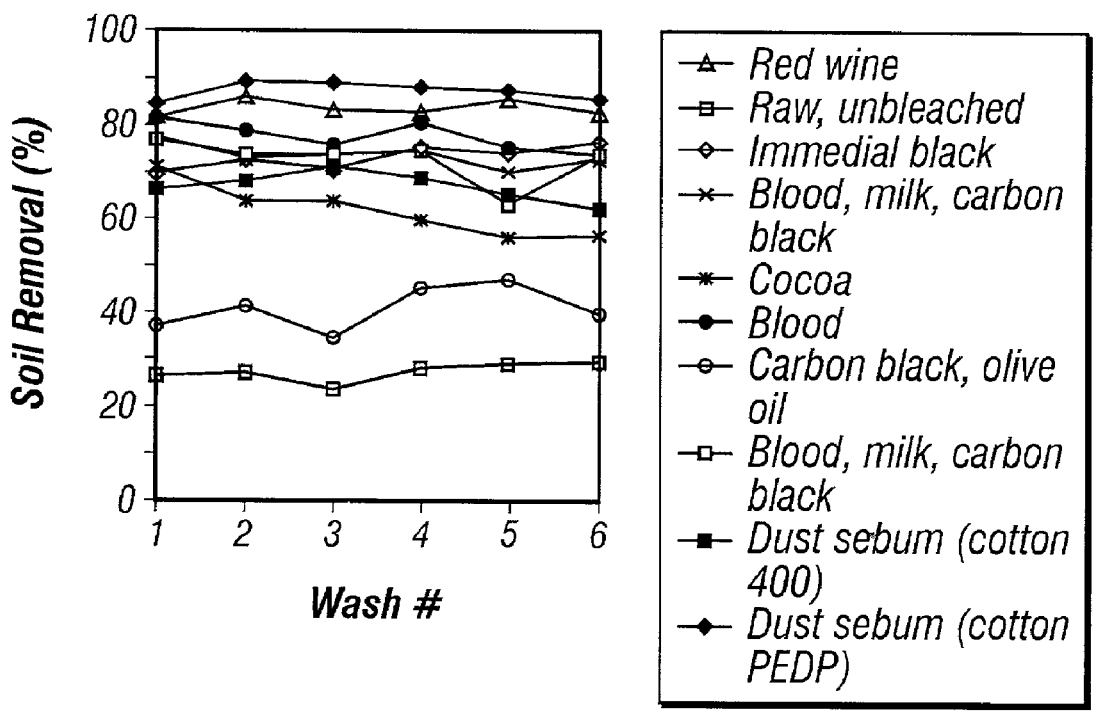
FIG. 31 is a graph reflecting the soil removal on test strips.

Using the same process flow as used in Set 5, this experiment used a Unimac™ industrial washer. In order to simulate conditions at steady state, a minimum of six washes were made in which water was treated from one run, and then used in the subsequent run. In order to titrate the active matter, soap, and available chlorine, water samples were taken after performing the washes and the filtrations. In addition, TOC analyses were performed in the water samples. The reflectance of washed swatches was measured using a Hunterlab™ spectrophotometer. For all the washes, the dosage of detergent and bleach was 70% (66.5 ml) and 180 ml, respectively. FIG. 31 shows the soil removal on the test strips that was observed. The following Tables 20–21 show soil removal for the wash/filtration sequence.

TABLE 20

Soil Removal for the Wash/filtration Sequence

| Wash | Red Wine | Raw, Unbleached | Immedial black | Blood, milk, Carbon black | Cocoa |
|---|---|---|---|---|---|
| 1 | 81.32 | 26.24 | 69.87 | 77.89 | 71.19 |
| 2 | 86.18 | 26.98 | 73.09 | 73.39 | 63.69 |
| 3 | 83.60 | 23/73 | 71.12 | 73.77 | 63.33 |
| 4 | 83.16 | 28.04 | 75.94 | 74.97 | 60.39 |
| 5 | 85.85 | 29.02 | 74.65 | 70.53 | 56.23 |
| 6 | 83.49 | 29.47 | 76.88 | 73.58 | 56.91 |

TALBE 21

Soil Removal for the Wash/filtration Sequence

| Wash | Blood | Carbon black, olive oil | Blood, milk, carbon black | Dust Sebum (Cotton 400) | Dust Sebum (PEDP) |
|---|---|---|---|---|---|
| 1 | 81.50 | 37.21 | 77.15 | 66.33 | 84.40 |
| 2 | 79.09 | 41.29 | 74.07 | 68.55 | 89.31 |
| 3 | 75.62 | 34.58 | 73.89 | 71.66 | 89.23 |
| 4 | 80.65 | 45.65 | 74.87 | 69.15 | 88.49 |
| 5 | 75.61 | 47.49 | 63.15 | 65.51 | 87.54 |
| 6 | 74.88 | 40.09 | 74.59 | 62.89 | 85.95 |

The following table shows the TOC results for the wash/filtration sequence:

TABLE 22

TOC Results for the Wash/filtration Sequence

| Wash # | Wash | Rinse (composite of 1, 2, 3) | Wash Retentate | Wash Permeate | Rinse Retentate | Rinse Permeate |
|---|---|---|---|---|---|---|
| 1 | 545 | 43 | 634 | 278 | 56 | 39 |
| 2 | 549 | 71 | 862 | 383 | 115 | 50 |
| 3 | 830 | 87 | 1275 | 484 | 149 | 82 |
| 4 | 978 | 101 | 1195 | 522 | 146 | 104 |
| 5 | 973 | 128 | 1152 | 592 | 158 | 120 |
| 6 | 1051 | 141 | — | — | — | — |

Figure 32:
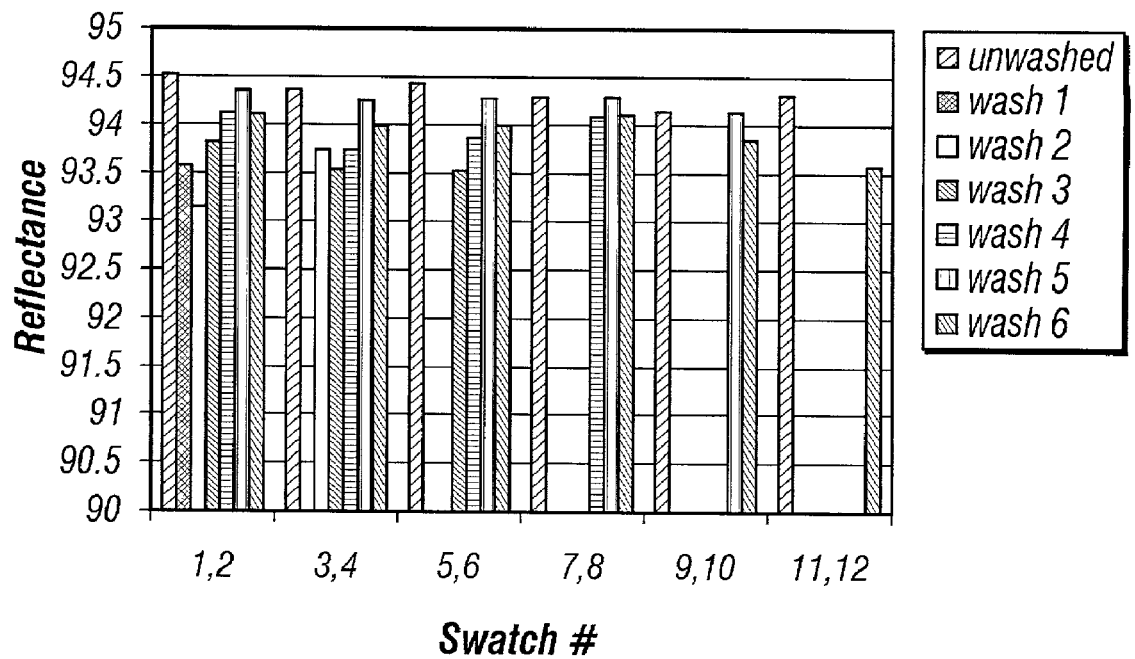
FIG. 32 is a chart reflecting the reflectance of redeposition swatches dried with fabric softener sheets.
Figure 33:
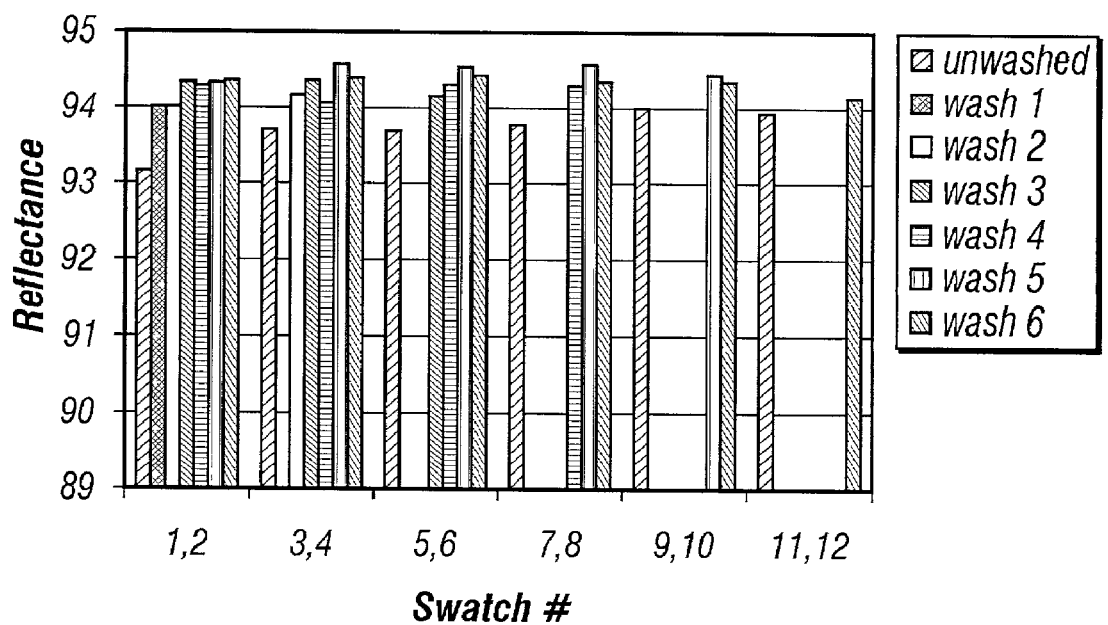
FIG. 33 is a chart reflecting the reflectance of redeposition swatches dried without fabric softener sheets.

During the wash/filtration sequence we studied the reflectance and brightness of redeposition swatches. These swatches were dried under different conditions. Some of them were dried with fabric softener, see FIG. 32, and some others were dried without fabric softener, see FIG. 33. These brightness of the redeposition swatches dried with and without fabric softener are shown in the following Tables 23 and 24.

TABLE 23

Brightness of Redeposition Swatches Dried with Fabric Softener

| Wash # | Swatches 1, 2 | Swatches 3, 4 | Swatches 5, 6 | Swatches 7, 8 | Swatches 9, 10 | Swatches 11, 12 |
|---|---|---|---|---|---|---|
| Unwashed | 87.27 | 86.99 | 86.08 | 87.42 | 86.58 | 87.02 |
| 1 | 85.98 | — | — | — | — | — |
| 2 | 85.70 | 86.02 | — | — | — | — |
| 3 | 85.95 | 85.18 | 85.47 | — | — | — |
| 4 | 86.70 | 86.00 | 86.00 | 86.42 | — | — |
| 5 | 86.55 | 86.76 | 86.79 | 86.88 | 86.91 | — |
| 6 | 86.22 | 86.02 | 86.14 | 86.50 | 85.91 | 85.77 |

TABLE 24

Brightness of Redeposition Swatches Dried without Fabric Softener

| Wash # | Swatches 1, 2 | Swatches 3, 4 | Swatches 5, 6 | Swatches 7, 8 | Swatches 9, 10 | Swatches 11, 12 |
|---|---|---|---|---|---|---|
| Unwashed | 84.82 | 85.66 | 85.31 | 86.05 | 86.15 | 85.88 |
| 1 | 86.20 | — | — | — | — | — |
| 2 | 86.15 | 86.63 | — | — | — | — |
| 3 | 86.92 | 86.82 | 86.68 | — | — | — |
| 4 | 86.90 | 86.78 | 86.74 | 86.90 | — | — |
| 5 | 87.07 | 87.15 | 86.97 | 87.21 | 86.57 | — |
| 6 | 86.63 | 86.75 | 86.85 | 86.64 | 86.73 | 86.82 |

The active matter percentage for the wash/filtration sequence was as follows:

TABLE 25

Active Matter Percentage for the Wash/Filtration Sequence

| Wash # | Wash | Rinse | Wash Retentate | Wash Permeate | Rinse Retentate | Rinse Permeate |
|---|---|---|---|---|---|---|
| 1 | 0.0473 | 0.0044 | 0.0660 | 0.0246 | 0.0043 | 0.0039 |
| 2 | 0.0471 | 0.0073 | 0.0903 | 0.0309 | 0.0088 | 0.0055 |
| 3 | 0.0705 | 0.0098 | 0.1406 | 0.0362 | 0.0126 | 0.0078 |
| 4 | 0.0785 | 0.0104 | 0.1249 | 0.0372 | 0.0131 | 0.0095 |
| 5 | 0.0772 | 0.0109 | 0.1196 | 0.0404 | 0.0151 | 0.0106 |
| 6 | 0.0785 | 0.0158 | — | — | — | — |

The soap percentage for the wash/filtration sequence was as follows:

TABLE 26

Soap Percentage for the Wash/Filtration Sequence

| Wash # | Wash | Rinse | Wash Retentate | Wash Permeate | Rinse Retentate | Rinse Permeate |
|---|---|---|---|---|---|---|
| 1 | 0.00383 | 0.00042 | 0.00393 | 0.00167 | 0.00047 | 0.00017 |
| 2 | 0.00291 | 0.00048 | 0.00558 | 0.00166 | 0.00111 | 0.00038 |
| 3 | 0.00505 | 0.00060 | 0.00840 | 0.00238 | 0.00110 | 0.00060 |
| 4 | 0.00580 | 0.00085 | 0.00800 | 0.00285 | 0.00118 | 0.00076 |
| 5 | 0.00660 | 0.00099 | 0.00807 | 0.00278 | 0.00124 | 0.00061 |
| 6 | 0.00708 | 0.00128 | — | — | — | — |

The available chlorine for the wash/filtration sequence was as follows:

TABLE 27

Available Chlorine for the Wash/Filtration Sequence

| Wash # | Wash | Rinse | Wash Retentate | Wash Permeate | Rinse Retentate | Rinse Permeate |
|---|---|---|---|---|---|---|
| 1 | 0.02234 | 0.00203 | 0.00359 | 0.00406 | 0.00172 | 0.00141 |
| 2 | 0.01344 | 0.00156 | 0.00375 | 0.00438 | 0.00109 | 0.00141 |
| 3 | 0.01969 | 0.00203 | 0.00484 | 0.00641 | 0.00109 | 0.00156 |
| 4 | 0.02000 | 0.00188 | 0.00422 | 0.00547 | 0.00094 | 0.00109 |
| 5 | 0.02188 | 0.00156 | 0.00547 | 0.00688 | 0.00125 | 0.00141 |
| 6 | 0.0230 | 0.00188 | — | — | — | — |

Those skilled in the art will recognize that substantial deviation is within the scope of the invention. Though the concepts of the invention have been described with reference to certain preferred embodiments of the system and methods of using these arrangements, this description is not limited to those embodiments as described and claimed herein. Persons of ordinary skill in the art will recognize that many modifications may be made to the present invention without departing from the spirit and scope of the present invention.

We claim:

1. A central laundry processing system comprising:
   at least one wash vessel;
   at least one detergent initially disposed in the at least one wash vessel;
   at least one wash loop wherein the at least one wash loop comprises:
     at least one wash effluent vessel in fluid communication with the at least one wash vessel;
     at least one wash filter in fluid communication with the at least one wash effluent vessel; and
     at least one wash permeate vessel in fluid communication with the at least one wash filter and the at least one wash vessel;
   at least one rinse loop wherein the at least one rinse loop comprises at least one rinse effluent vessel in fluid communication with the at least one wash vessel; and
   at least one conduit disposed in fluid communication with the at least one rinse effluent vessel and the at least one wash effluent vessel wherein to at least one conduit is adapted to a allow transfer of fluid from the at least one rinse effluent vessel to the at least one wash effluent vessel.

2. The system of claim 1 wherein the rinse loop further comprises:
   at least one rinse filter in fluid communication with the rinse effluent vessel; and
   at least one rinse permeate vessel in fluid communication with the at least one rinse filter and the at least one wash vessel.

3. The system of claim 2 further comprising at least one rinse retentate loop between the at least one rinse filter and the at least one rinse effluent vessel.

4. The system of claim 3 wherein rinse loop has a recycle ratio of between about 30% and about 90%.

5. The system of claim 3 wherein rinse loop has a recycle ratio of between about 30% and about 80%.

6. The system of claim 2 wherein each wash filter and each rinse filter has a filter size in a range of about 0.005 microns to about 5 microns.

7. The system of claim 2 wherein each wash filter and each rinse filter has a filter size in a range of about 0.01 microns to about 0.2 microns.

8. The system of claim 2 wherein each wash filter and each rinse filter comprises a fluoropolymer, a polyacrylonitrile, a ceramic, a polyethylene terephthalate, a polyvinylidene fluoride, cellulose, cellulose acetate, or a polypropylene.

9. The system of claim 2 wherein each wash filter and each rinse filter comprises polyacrylonitrile.

10. The system of claim 2 wherein each wash filter and each rinse filter is a crossflow filter.

11. The system of claim 2 wherein each wash filter and each rinse filter is a vibratory-enhanced filter.

12. The system of claim 2 wherein each wash filter and each rinse filter has a temperature of between about 10° C. and about 90° C.

13. The system of claim 2 wherein each wash filter and each rinse filter has a temperature of about 30° C.

14. The system of claim 1 wherein each wash filter has a filter size in a range of about 0.005 microns to about 5 microns.

15. The system of claim 1 wherein each wash filter has a filter size in a range of about 0.01 microns to about 0.2 microns.

16. The system of claim 1 wherein each wash filter comprises a fluoropolymer, a polyacrylonitrile, a ceramic, a polyethylene terephthalate, a polyvinylidene fluoride, cellulose, cellulose acetate, or a polypropylene.

17. The system of claim 1 wherein each wash filter comprises polyacrylonitrile.

18. The system of claim 1 wherein each wash filter is a crossflow filter.

19. The system of claim 1 wherein each wash filter is a vibratory-enhanced filter.

20. The system of claim 1 wherein each wash vessel is a household top-load machine, household front-load machine, or an industrial front-load machine.

21. The system of claim 1 wherein each wash vessel is an industrial front-load washing machine.

22. The system of claim 1 wherein the detergent is a powder.

23. The system of claim 1 wherein the detergent is a liquid.

24. The system of claim 1 wherein the detergent comprises surfactants.

25. The system of claim 1 wherein the detergent comprises anionic surfactants, nonionic surfactants, cationic surfactants, phosphate surfactants, or amphoteric surfactants.

26. The system of claim 1 wherein the detergent comprises builders.

27. The system of claim 1 wherein the detergent comprises sodium carbonate, zeolite, or soda ash.

28. The system of claim 1 wherein the detergent comprises fluorescent whitening agents.

29. The system of claim 1 wherein the detergent comprises enzymes.

30. The system of claim 1 wherein the detergent comprises polyvinyl pyrrolidone, carboxymethylcellulose, or polyacrylate.

31. The system of claim 1 wherein the detergent comprises perfumes.

32. The system of claim 1 wherein the detergent comprises bleach.

33. The system of claim 1 wherein the detergent comprises chlorine or peroxygen.

34. The system of claim 1 wherein the detergent comprises defoamer.

35. The system of claim 1 wherein the detergent comprises soap or silicon oil.

36. The system of claim 1 wherein the detergent comprises liquid detergent with chlorine bleach, nonionic surfactants, silicone defoamers, and no zeolite.

37. The system of claim 1 wherein the wash loop has a temperature of between about 10° C. and about 90° C.

38. The system of claim 1 wherein the wash loop has a temperature of about 40° C.

39. The system of claim 1 wherein the rinse loop has a temperature of between about 10° C. and about 90° C.

40. The system of claim 1 wherein the rinse loop has a temperature of about 25° C.

41. The system of claim 1 wherein each wash filter has a temperature of between about 10° C. and about 90° C.

42. The system of claim 1 wherein each wash filter has a temperature of about 30° C.

43. The system of claim 1 wherein wash loop has a recycle ratio of between about 30% and about 90%.

44. The system of claim 1 wherein wash loop has a recycle ratio of between about 30% and about 90%.

45. The system of claim 1 wherein the at least one rinse loop further comprises:
   at least one rinse filter in fluid communication with the at least one rinse effluent vessel; and
   at least one rinse permeate vessel in fluid communication with the at least one rinse filter and the at least one wash vessel.

46. The system of claim 45 further comprising at least one rinse retentate loop between the at least one rinse filter and the at least one rinse effluent vessel.

47. The system of claim 46 further comprising at least one wash retentate loop between the at least one wash filter and the at least one wash effluent vessel.

48. The system of claim 45 further comprising at least one wash retentate loop between the at least one wash filter and the at least one wash effluent vessel.

49. The system of claim 1 further comprising at least one wash retentate loop between the at least one wash filter and the at least one wash effluent vessel.

50. A central laundry processing system comprising:
   at least one wash vessel;
   at least one detergent initially disposed in the at least one wash vessel;
   at least one wash loop comprising:
      at least one wash effluent vessel in fluid communication wit the at least one wash vessel;
      at least one wash filter in fluid communication with the at least one wash effluent vessel; and
      at least one wash permeate vessel in fluid communication with the at least one wash filter and the at least one wash vessel;
   at least one rinse loop independent of the at least one wash loop and comprising at least one rinse effluent vessel in fluid communication with the at least one wash vessel.

51. The system of claim 50 wherein the at least one rinse loop further comprises:
   at least one rinse filter in fluid communication with the at least one rinse effluent vessel; and
   at least one rinse permeate vessel in fluid communication with the at least one rinse filter and the at least one wash vessel.

52. The system of claim 51 further comprising at least one wash retentate loop between the at least one wash filter and the at least one wash effluent vessel.

53. The system of claim 51 further comprising at least one rinse retentate loop between the at least one rinse filter and the at least one rinse effluent vessel.

54. The system of claim 53 further comprising at least one wash retentate loop between the at least one wash filter and the at least one wash effluent vessel.

55. The system of claim 54 further comprising at least one conduit disposed in fluid communication with the at least one rinse effluent vessel and the at least one wash effluent vessel wherein the at least one conduit is adapted to allow transfer of fluid from the at least one rinse effluent vessel to the at least one wash effluent vessel.

56. The system of claim 53 further comprising at least one conduit disposed in fluid communication with the at least one rinse effluent vessel and the at least one wash effluent vessel wherein the at least one conduit is adapted to allow transfer of fluid from the at least one rinse effluent vessel to the at least one wash effluent vessel.

57. The system of claim 53 wherein the rinse effluent retentate comprises make up water in the wash loop.

58. The system of claim 50 further comprising at least one conduit disposed in fluid communication with the at least one rinse effluent vessel and the at least one wash effluent vessel wherein the at least one conduit is adapted to allow transfer of fluid from the at least one rinse effluent vessel to the at least one wash effluent vessel.

59. A central laundry processing system comprising:
   at least one wash vessel;
   at least one detergent initially disposed in the at least one wash vessel;
   at least one wash loop comprising:
      at least one wash effluent vessel in fluid communication with the at least one wash vessel;
      at least one wash filter In fluid communication with the at least one wash effluent vessel; and
      at least one wash permeate vessel in fluid communication wit the at least one wash filter and the at least one wash vessel;
   at least one rinse loop comprising:
      at least one rinse effluent vessel in fluid communication with the at least one wash vessel;
      at least one rinse filter in fluid communication with the at least one rinse effluent vessel; and
      at least one rinse permeate vessel in fluid communication with the at least one rinse filter and the at least one wash vessel;
   at least one wash retentate loop between the at least one wash filter and the at least one wash effluent vessel;
   at least one rinse retentate loop between the at least one rinse filter and the at least one rinse effluent vessel; and
   at least one conduit disposed in fluid communication with the at least one rinse effluent vessel and the at least one wash effluent vessel wherein the at least one conduit is adapted to allow transfer of fluid from the at least one rinse effluent vessel to the at least one wash effluent vessel.

* * * * *